(12) United States Patent
Kusuta et al.

(10) Patent No.: US 9,385,964 B2
(45) Date of Patent: Jul. 5, 2016

(54) RESOURCE MANAGEMENT METHOD AND MANAGEMENT SERVER

(75) Inventors: Shoichi Kusuta, Tokyo (JP); Tomohito Uchida, Tokyo (JP); Yoshifumi Takamoto, Tokyo (JP); Takashi Tameshige, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 14/007,848

(22) PCT Filed: Apr. 1, 2011

(86) PCT No.: PCT/JP2011/058390
§ 371 (c)(1),
(2), (4) Date: Sep. 26, 2013

(87) PCT Pub. No.: WO2012/137272
PCT Pub. Date: Oct. 11, 2012

(65) Prior Publication Data
US 2014/0019624 A1    Jan. 16, 2014

(51) Int. Cl.
*G06F 15/173* (2006.01)
*H04L 12/911* (2013.01)
*G06F 9/50* (2006.01)
*G06F 11/34* (2006.01)
*G06F 9/46* (2006.01)

(52) U.S. Cl.
CPC ............... *H04L 47/70* (2013.01); *G06F 9/505* (2013.01); *G06F 9/5077* (2013.01); *G06F 11/3428* (2013.01); *G06F 2201/815* (2013.01); *G06F 2209/508* (2013.01); *G06F 2209/5019* (2013.01)

(58) Field of Classification Search
CPC .............. H04L 29/08144; H04L 29/06; H04L 29/08072
USPC ......................................................... 709/226
See application file for complete search history.

(56) References Cited

U.S. PATENT DOCUMENTS

| | | |
|---|---|---|
| 2005/0198641 A1 | 9/2005 | Eilam et al. |
| 2006/0150157 A1 | 7/2006 | Fellenstein et al. |
| 2007/0297350 A1 | 12/2007 | Eilam et al. |
| 2008/0235702 A1 | 9/2008 | Eilam et al. |
| 2009/0132703 A1 | 5/2009 | Fellenstein et al. |
| 2010/0131957 A1 | 5/2010 | Kami |
| 2010/0229171 A1 | 9/2010 | Yoshimura et al. |

FOREIGN PATENT DOCUMENTS

| | | |
|---|---|---|
| JP | 2007-526557 A | 9/2007 |
| JP | 2008-527513 A | 7/2008 |
| JP | 2010-205209 A | 9/2010 |
| JP | 2011-018198 A | 1/2011 |
| WO | 2008/132924 A1 | 11/2008 |

*Primary Examiner* — Chris Parry
*Assistant Examiner* — Alan S Chou
(74) *Attorney, Agent, or Firm* — Mattingly & Malur, PC

(57) ABSTRACT

In order to effectively use the resources on a network, there is provided a management server (200) for selecting each resource of a resource information table (211) as a test resource, if the extraction probability for each resource is equal to or greater than the random numbers probability generated by a random number generation part (221), forming a test server by combining the selected resources, performing the job by using the formed test server, and applying the test server as the server of the particular network if the execution result of the job meets the job determination method.

20 Claims, 17 Drawing Sheets

211 RESOURCE INFORMATION TABLE

| RESOURCE NAME | TYPE | VERTUAL RELATION-SHIP | LOGICAL EIGENVALUE CONFIGU-RATION | PHYSICAL POSITION | ALLOCATION STATE | USAGE GRAPH | PRESENCE /ABSENCE OF FAILURE | TEST INFOR-MATION | EXTRACTION PROBABILITY |
|---|---|---|---|---|---|---|---|---|---|
| FC1 | FC | PARENT OF VIRTUAL FC2 | WWW INFOR-MATION | I/O EXPANSION APPARATUS 1 | Srv1 | Graph1 | ABSENT | EXPAN-SION (2) | 37.5% |
| LAN2 | LAN | VIRTUAL DEVICE OF LAN1 | IP INFOR-MATION | VIRTUALI-ZATION MECHANISM OF Srv2 | Srv3 | Graph2 | ABSENT | FAILURE (1) | 12.5% |
| MEM1 | Memory | – | – | STORAGE APPARATUS 1 | – | Graph3 | PRESENT | REDUC-TION (3) | 25% |
| HDD1 | HDD | PARENT OF VHD1 | – | BUS CONTROL APPARATUS 1 | Srv4 | Graph4 | ABSENT | MAINTE-NANCE | 10% |
| CPU1 | CPU | – | – | Srv1 | Srv1 | Graph5 | ABSENT | – | 55% |

701　702　703　704　705　706　707　708　709　710

(B)

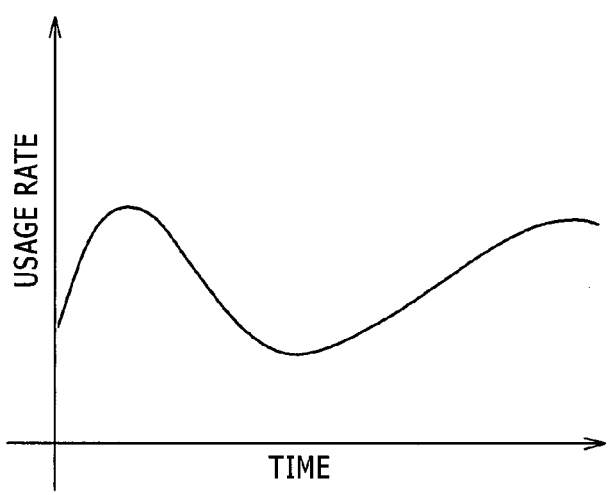

FIG.8

212 IMPROVED RESOURCE INFORMATION TABLE

| RESOURCE NAME (801) | TYPE (802) | VERTUAL RELATIONSHIP (803) | LOGICAL/ EIGENVALUE CONFIGURATION (804) | PHYSICAL POSITION (805) | ALLOCATION STATE (806) | PRESENCE /ABSENCE OF FAILURE (808) |
|---|---|---|---|---|---|---|
| MEM2 | Memory | — | — | Srv9 | — | ABSENT |
| LAN1 | LAN | — | IP INFORMATION | IO EXPANSION APPARATUS 1 | Srv1 | ABSENT |
| VHD1 | HDD | VIRTUALIZATION ON Srv3 | — | HDD1 | VSrv1 | PRESENT |
| VERTUAL SCSI1 | SCSI | VIRTUALIZATION ON Srv6 | — | Srv6 | VSrv4 | ABSENT |

FIG.9

213 HISTORY TABLE

| RESOURCE INFORMATION UPDATED DATE (901) | NUMBER OF RESOURCE CHANGES (902) | NUMBER OF RELATIONSHIP CHANGES (903) |
|---|---|---|
| 2010/12/28 10:00 | 2 | 0 |
| 2010/12/28 8:00 | 15 | 2 |
| 2010/11/13 5:00 | 0 | 3 |
| 2010/09/12 6:00 | 0 | 0 |

FIG.10

214 SERVER RELATIONSHIP TABLE

| SERVER NAME (1001) | RESOURCE SHARING (1002) | INTERCOMMUNICATION (1003) | START TIME (1004) |
|---|---|---|---|
| Srv1 | Srv2 | Srv3 | Srv6 |
| Srv2 | Srv1 | — | — |
| Srv3 | — | Srv1 | Srv2 |
| Srv4 | Srv5 | — | Srv3 |

FIG.11

215 JOB MANAGEMENT TABLE

| JOB ID | JOB CONTENTS | COMPARATIVE VALUE | DETERMINATION METHOD |
|---|---|---|---|
| JOB 1 | JOB A EXECUTION | — | ADOPTED IF IT CAN BE DONE WITHOUT PROBLEMS |
| JOB 2 | JOB B EXECUTION, TIME MEASUREMENT | 5 SECONDS | ADOPTED IF THE EXECUTION TIME IS LESS THAN THE COMPARATIVE VALUE |
| JOB 3 | DATA SAVE | — | ADOPTED IF IT CAN BE SAVED |
| JOB 4 | JOB C EXTRACTION | — | ADOPTED IF IT CAN BE DONE FOR ALL RELATED SERVERS WITHOUT PROBLEMS |
| JOB 5 | COMMUNICATION | — | ADOPTED IF IT CAN BE COMMUNICATED WITH ALL RELATED SERVERS |
| JOB 6 | APPLICATION EXECUTION | — | ADOPTED IF SPECIFIC APPLICATION CAN RUN WITHOUT PROBLEMS |
| JOB 7 | MEMORY LOAD | LOAD RESULT 1 | ADOPTED IF THE RESULT BETTER THAN LOAD RESULT 1 IS RECORDED |

218 IMPROVEMENT SPECIFICATION-JOB RELATIONSHIP TABLE

| IMPROVEMENT SPECIFICATION | JOB ID |
|---|---|
| NEW | JOB 1 |
| IMPROVEMENT | JOB 2 |
| MAINTENANCE | JOB 3 |
| EXPANSION | JOB 4 |
| REDUCTION | JOB 5 |
| Srv3 | JOB 6 |
| MEMORY | JOB 7 |

216 JOB RESULT MANAGEMENT TABLE

| IMPROVEMENT ID (1301) | SERVER GROUP (1302) | RESOURCE 1 (1303) | RESOURCE 2 (1304) | RESOURCE 3 (1305) | RESOURCE 4 (1306) | JOB ID (1307) | JOB RESULT (1308) |
|---|---|---|---|---|---|---|---|
| Test1 | Srv3 | CPU1×1 | Mem1 | HDD1 | LAN1 | JOB 3 JOB 6 | APPLICATION OPERATION SUCCESSFUL |
| Test2 | VSrv2 | VCPU2 | VMem2 | VHDD2 | VFC2 | JOB 2 | EXECUTION FAILED |
| Test3 | Srv5 | VCPU1 | VMem1 | HDD3 | SCSI1 | JOB 4 | EXECUTION SUCCESSFUL |
| Test4 | Srv10 (NEWLY GENERATED SERVER) | VCPU2 | VMem2 | HDD4 | — | JOB 3 | SAVE SUCCESSFUL |

FIG.14

217 IMPROVEMENT RECORD TABLE

| IMPROVEMENT ID (1401) | IMPROVEMENT SPECIFICATION (1402) | ADOPTION CONFIGURATION (1403) | INFORMATION COLLECTION POLICY (1404) | SERVER GROUP (1405) | SERVER GROUP RELATIONSHIP (1406) | SUCCESS OR FAILURE (1407) | EXCESS DETERMINATION (1408) | NUMBER OF TIMES (1409) |
|---|---|---|---|---|---|---|---|---|
| Test1 | MAINTENANCE Srv3 | RESOURCE MINIMUM | REGULAR | Srv1, Srv2, Srv3 | START TIME, INTERCOMMUNICATION | TIME OUT (REQUIRED TIME 107h) | 100h | 10 |
| Test2 | IMPROVEMENT VSrv1 | RESOURCE AGGREGATION | MONITOR | VSrv1, VSrv2 | RESOURCE SHARING (HDD1) | UNIMPROVED (REQUIRED TIME 10h) | 10h | 3 |
| Test3 | EXPANSION | NO | MONITOR | Srv5 | NO | SUCCESS (REQUIRED TIME 7h) | 12h | 4 |
| Test4 | NEW | RESOURCE DISTRIBUTION | REGULAR | 3 NEW SERVERS | INTERCOMMUNICATION | SUCCESS (REQUIRED NUMBER OF TIMES 3) | 5 TIMES | 3 |

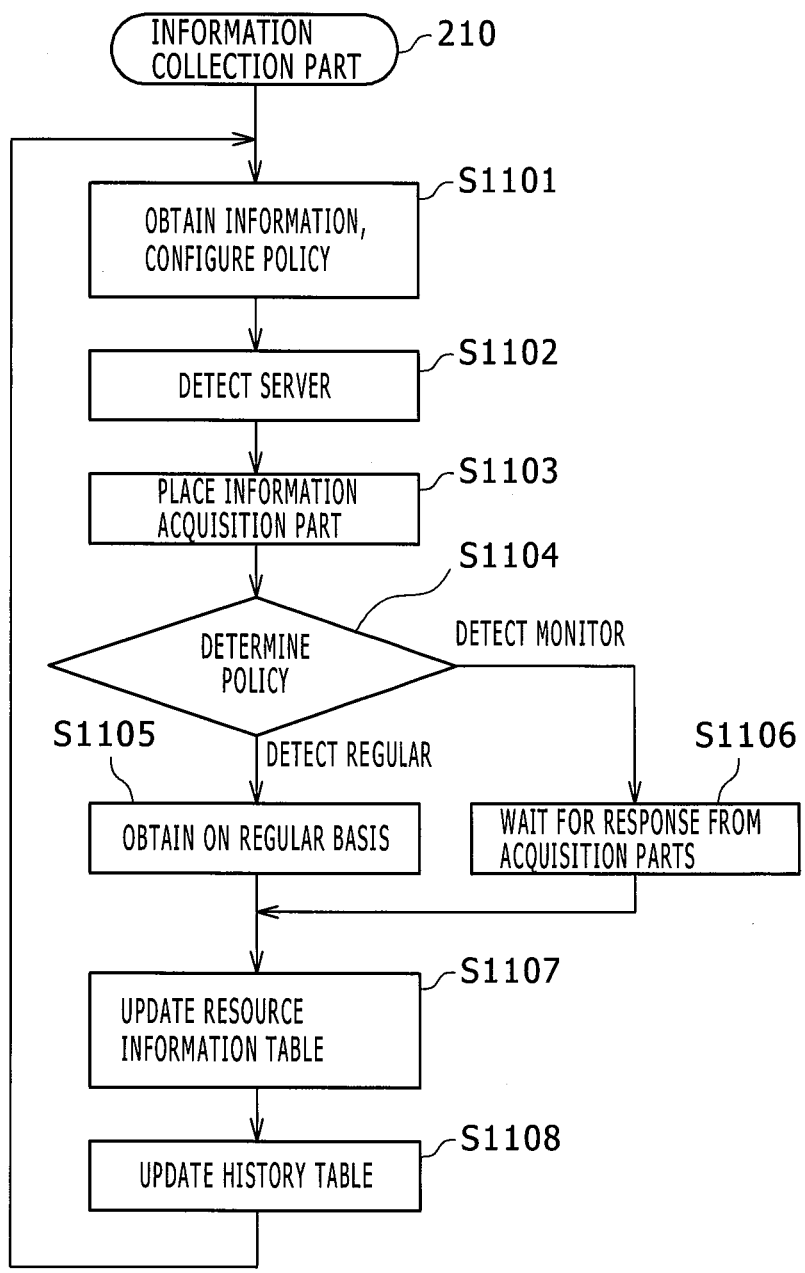

RESOURCE MANAGEMENT METHOD AND MANAGEMENT SERVER

TECHNICAL FIELD

The present invention relates to a resource management method and a management server that can effectively use resources on a network.

BACKGROUND ART

In recent years, the number of resources tends to increase with the introduction of a large scale cloud technology, a bus architecture that can combine resources between different severs, and an I/O switch expansion apparatus that can switch I/O (Input/Output) device allocation between servers.

Further, with the popularity of could technology, the number of unspecified users or administrators increases, so that the number of unspecified or unknown hardware devices increases and decreases randomly. Under these circumstances, it is important how the allocation of resources is managed. The management of the allocation of resources is deeply involved in reducing the cost of the maintenance of the resources and increasing the performance of the server provided to the user.

There is disclosed a method for managing the allocation of resources based on the calculation in a virtual computer system (for example, see Patent Literature 1). A virtual computer system includes a plurality of virtual apparatus for executing applications by sharing physical resources of a computer, a plurality of virtualization means for managing the plurality of virtual apparatus, and a management means for controlling the plurality of virtualization means. The virtual computer system performs first and second optimization calculations by exchanging resource supply information (for example, resource allocation amount) and resource request information between a plurality of virtual apparatus and the management means, in order to actively allocate physical resources.

CITATION LIST

Patent Literature 1: WO2008/132924

SUMMARY OF INVENTION

Technical Problem

In the case of resources in which variation occurs, if the method based on the calculation disclosed in Patent Literature 1 is preformed to improve the resource allocation, reliable improved allocation information may not be provided to the administrator due to parameter difference between before and after checking parameters required for calculation (for example, the resource type and the configuration condition), and between before and after calculation using these parameters.

Further, also in the case of resources in which variation does not occur, the desired performance may not be achieved in the improvement of the resource allocation based on calculation, depending on the combination of resources due to the influence of the unknown device environmental conditions (temperature or humidity, connected devices, failure, distance, communication traffic volume, and the like).

Thus, it is considered that it is necessary for resources as managed objects to provide a mechanism for the allocation of resources in order to achieve desired performance, at any time, by using information that can be obtained independent of the calculation method, without prior preparation, and with as little limitation on the time required for improvement as possible.

The present invention is directed to solving the problems described above, and an object of the present invention is to provide a resource management method and a management server that can effectively use resources on a network.

Solution to Problem

In order to achieve the above object, a resource management method according to the present invention is used for a computer system with a plurality of servers connected to a network, in which a management server forms a test server (for example, a test physical server 100$b$, a test virtual server 130$b$) by combining resources that can be reserved in the network, and applies the test server as the server of the particular network if the test server meets a predetermined condition.

The management server stores resource information (for example, a resource information table 211) with respect to the resources that can be reserved in the network, in which the extraction probability is registered as application information which is the actual result of applying the test server, as well as job management information (for example, a job management table 215) for managing the job, which is the predetermined condition of whether the test server is adopted, into a storage part. Further, if the extraction probability is equal to or greater than the random numbers probability that is generated in a random number generation part, with respect to each of the resources in the resource information, the management server selects as test resources. Then, the management server forms a test server by combining the selected resources, and performs the job by using the test server formed as described above. If the performance result is good, the management server applies the test server as the server of the particular network.

Advantageous Effects of Invention

According to the present invention, it is possible to effectively use the resources on the network.

BRIEF DESCRIPTION OF DRAWINGS

FIG. 7 shows an example of a resource information table and a usage graph, in which FIG. 7($a$) is a view of an example of the resource information table, and FIG. 7($b$) is a view of an example of the usage graph;

FIG. 8 is a view of an example of an improved resource information table;

FIG. 9 is a view of an example of a history table;

FIG. 10 is a view of an example of a server relationship table;

FIG. 11 is a view of an example of a job management table;

FIG. 12 is a view of an example of a relationship table between improvement specification and job;

FIG. 13 is a view of an example of a job result management table;

FIG. 14 is a view of an example of an improvement record table;

FIG. 15 is a flow chart of the process of an information collection part;

DESCRIPTION OF EMBODIMENTS

Hereinafter, an embodiment of the present invention will be described in detail with reference to the accompanying drawings.

Figure 1:
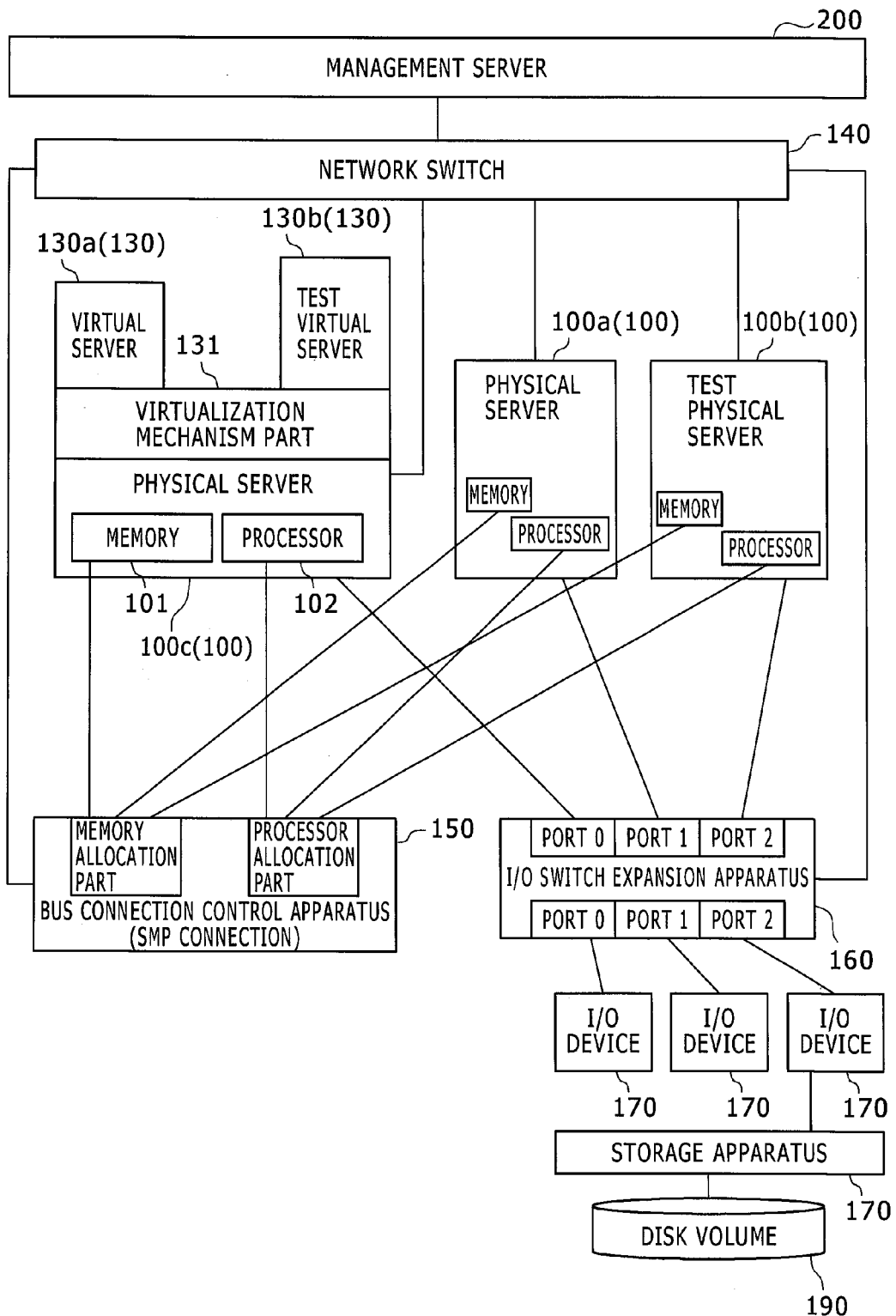
FIG. 1 is an overall block diagram of a network system according to the present invention.

FIG. 1 is an overall block diagram of a network system according to the present invention. As shown in FIG. 1, in the network system, a management server 200 is connected to one or more physical servers 100, an I/O switch expansion apparatus 160, and a bus connection control apparatus 150 through a network switch 140. A storage apparatus 180 including a disk volume 190 is connected to the physical servers 100 through the I/O switch expansion apparatus 160 and an I/O device 170. Note that physical server 100 also includes a physical server including a virtualization mechanism part 131 to provide a virtual server 130.

The management server 200 is the center of the control to improve the resource allocation in order to effectively use the resource group in the network system. The resource group is the collective term for resources, which means the combination of components included in a server (for example, processor, memory, HDD, FC (Fibre Channel), LAN, and the like).

The management server 200 according to the present embodiment collects information of resources on the network from the physical server 100, forms a test server (a test physical server 100b, a test virtual server 130b) by combining the unused resources of the unallocated resource group. Then, if the test server meets a predetermined condition, the management server 200 applies the test server as the server on the particular network. Note that the test server is a general expression that includes the test physical server 100b and the test virtual server 130b.

Figure 2:
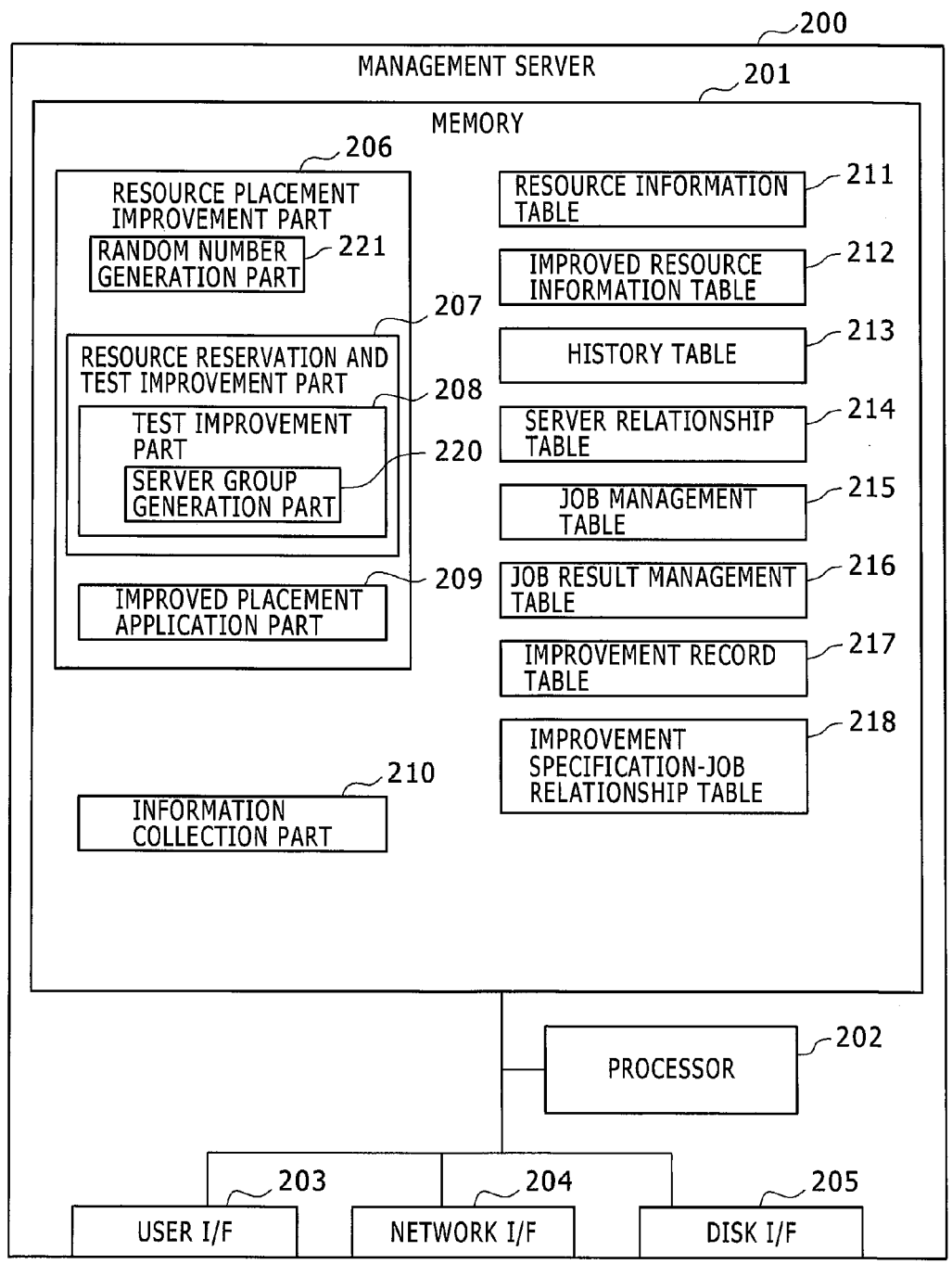
FIG. 2 is a detailed block diagram of a management server.

The management server 200 stores the resource information table 211 (see FIG. 7) for the resources that can be reserved on the network, in which the extraction probability Ep is registered as application information which is the actual result of applying the test server, as well as the job management table 215 (see FIG. 11) for managing the job, which is the predetermined condition of whether the test server is adopted, into the memory 201 (storage part) (see FIG. 2). Further, if the extraction probability Ep is equal to or greater than the random numbers probability Rp generated by a random number generation part 221 (see FIG. 2) with respect to each of the resources of the resource information, the management server 200 selects as test resources. Then, the management server 200 forms a test server by combining the selected resources, and performs the job by using the test server formed as described above. If the performance result is good, the management server 200 can apply the test server as the server on the particular network.

Returning to FIG. 1, in which the bus connection control apparatus 150 performs, for example, a method for extending performance by an SMP (Symmetric Multi-Processor) connection between the physical servers 100 (for example, between server blades). The SMP connection is a method for extending performance to generate a higher performance server by joining a plurality of server blades together. In response to an instruction of the management server 200, the bus connection control apparatus 150 allocates the memory 101 and the processor 102 to the physical servers 100 (the physical server 100a, the test physical server 100b, and the physical server 100c for the virtual server), respectively.

FIG. 2 is a detailed block diagram of the management server 200. The management server 200 includes a memory 201 (storage part), a processor 202 (processing part), a user I/F 203, a network I/F 204, and a disk I/F 205.

The memory 201 includes a resource placement improvement part 206 (see FIG. 16), and an information collection part 210 (see FIG. 15). The memory 201 also includes various tables including the resource information table 211 (see FIG. 7), the improved resource information table 212 (see FIG. 8), the history table 213 (see FIG. 9), the server relationship table 214 (see FIG. 10), the job management table 215 (see FIG. 10), a job result management table 216 (see FIG. 12), an improvement record table 217 (see FIG. 13), and an improvement specification-job relationship table 218 (see FIG. 14).

Figure 18:
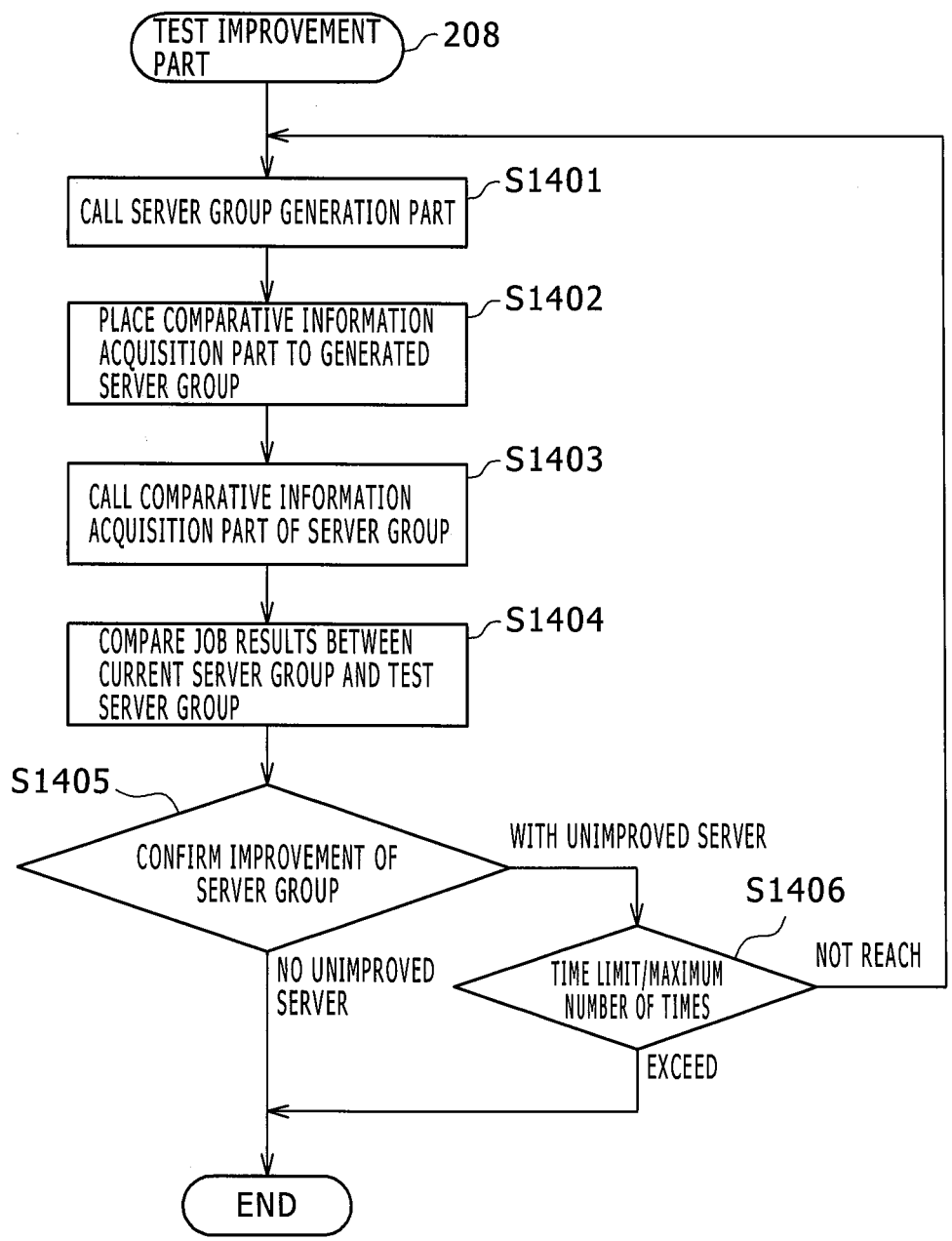
FIG. 18 is a flow chart of the process of a test improvement part.
Figure 19:
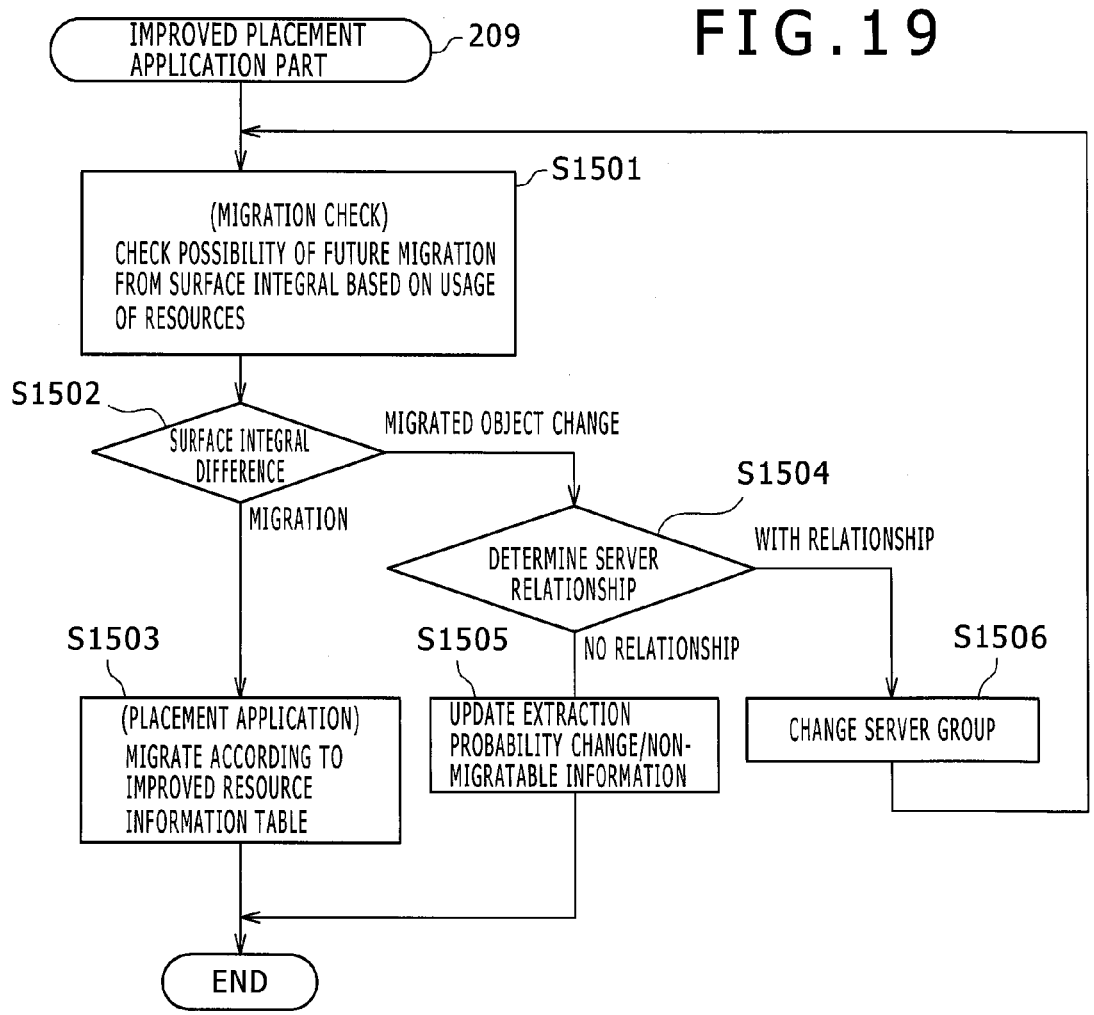
FIG. 19 is a flow chart of the process of an improved placement application part.

The resource placement improvement part 206 includes the random number generation part 221, a resource reservation and test improvement part 207 (see FIG. 17), and an improved placement application part 209 (see FIG. 19). The resource reservation and test improvement part 207 includes a test improvement part 208 (see FIG. 18) including a server group generation part 220 (see FIG. 24).

The user I/F 203 is the interface for inputting the request of the user to the management server 200 when each table within the memory 201 is updated based on the user definition. The network I/F 204 is the interface for connecting each of the servers to the network. The disk I/F 205 is the interface for connecting each of the servers to the disk volume 190 (see FIG. 1).

The resource placement improvement part 206 can improve the resource allocation by the method based on tests and by the method based on calculation. In the method based on tests, the resource placement improvement part 206 configures the extraction probability Ep of resources by the method based on tests such as new, improvident, maintenance, expansion, reduction, and failure identification. Then, the resource placement improvement part 206 calls the reservation and test improvement part 207. The resource reservation and test improvement part 207 checks the usage of each resource to the extent possible, from the server group connected to the network. Then, the resource reservation and test improvement part 207 reserves the test resource and calls the test improvement part 208. The test improvement part 208 forms a test server by the reserved resources, and performs the job by the formed test server and also by the current server. Then, the test improvement part 208 compares the job results of the current server and the test server to check the improvement of the server group. Based on the result of the comparison, the test improvement part 208 updates the success or failure of the improvement result. Then, if the server group is improved, the improved placement application part 209 applies the generated test server or test virtual server.

The random number generation part 221 is a generator of random numbers. The generated random numbers probability Rp (random number value) is used to be compared with the extraction probability Ep of the resource information table 211 (see FIG. 7). With respect to the random number value, for example, the maximum and minimum numbers are given and random numbers are generated between the given values. The extraction probability Ep is stored for each resource in the resource information table 211 (see FIG. 7). It is configured so that the extraction probability Ep of all the resources is not 0%. If the extraction probability Ep of each resource is equal to or greater than the random number value generated by the random number generation part 221, the particular resource is adopted as the test resource. A different random number is generated each time for each resource by the random generation part 221, which is also a feature of the present invention.

More specifically, if the extraction probability Ep of a first resource is 37.5, an integer random number is generated with the minimum value 0 and the maximum number 99, and the random number value 12 is obtained. Then, the result is 12≤37.5, so that the target resource is adopted. If the extraction probability Ep of the next second resource is 12.5, a different random number value is generated each time, instead of comparing it with the previously generated random number value 12.5. If the random number value for the second resource is 14, the result is 14>12.5, so that the second resource is not adopted.

Note that the test is performed with the initial value 50% for the extraction probability Ep of the resources. Then, the value is updated each time the test is performed, by the change of the extraction probability Ep in the resource placement improvement part 206 (see steps S1206 to S1209 in FIG. 16). Finally, the value is between 0% <the extraction probability Ep ≤100%.

Different from the method of selecting resources meeting the condition configured by the administrator to generate a server according to the conventional technology, the method according to the present embodiment generates a server by randomly extracting unallocated resources, and evaluates the performance of the generated server by the job. Thus, it is very likely to crate resource combinations that would have been unthinkable in the past. Also in the case of the selection based on the calculation, which is one of the conventional technologies, there is no room for contingency in the resource selection. However, in the present embodiment, it is very likely to have contingency in the resource selection. This point is a feature of the present invention. Note that the probability generated by the random number generation part 221 is used as one of the means to provide a random extraction method. However, it should be understood that the present invention is not limited to this example.

Figure 3:
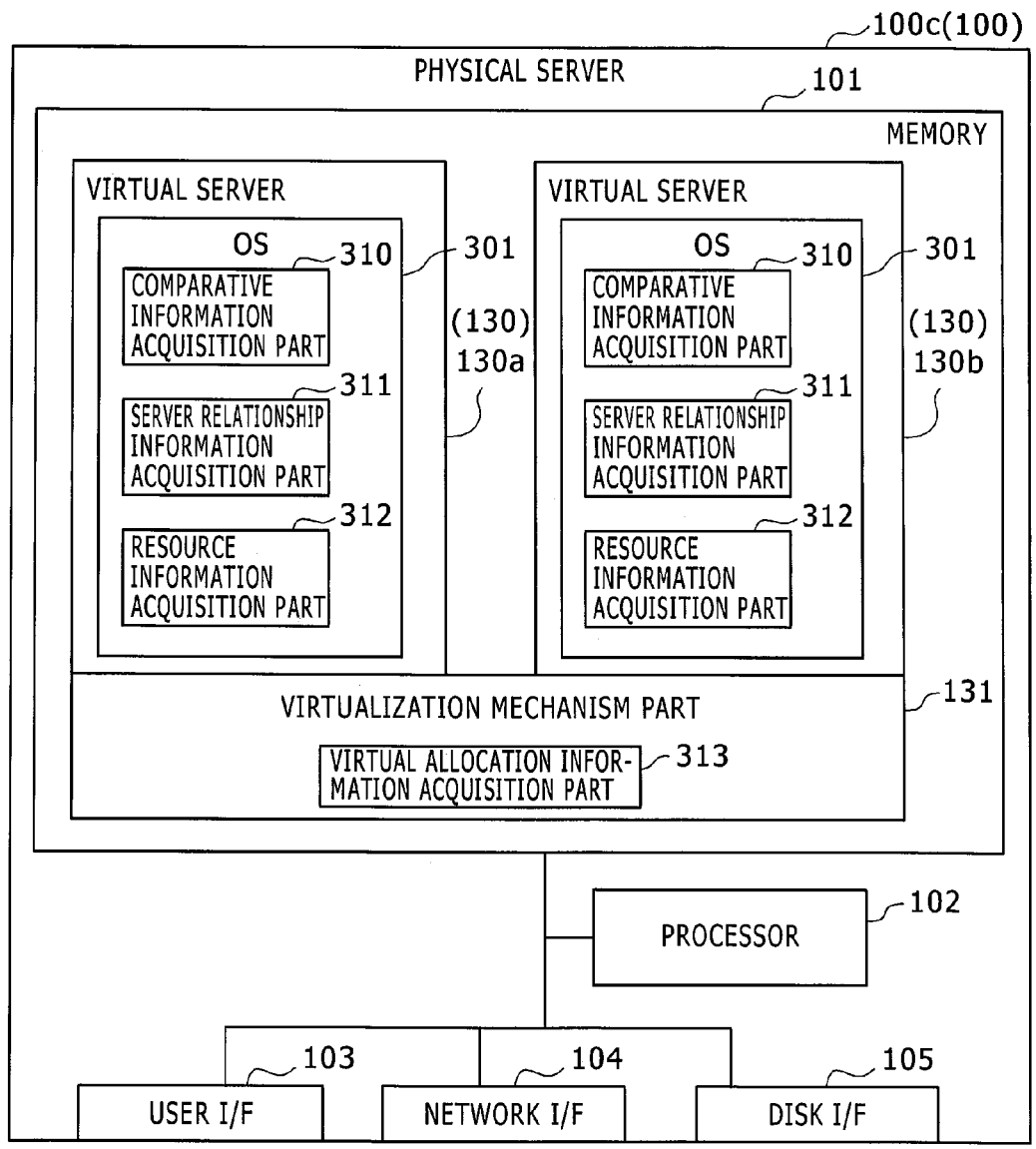
FIG. 3 is a detailed block diagram of a physical server adopting a virtual server and a test virtual server.
Figure 4:
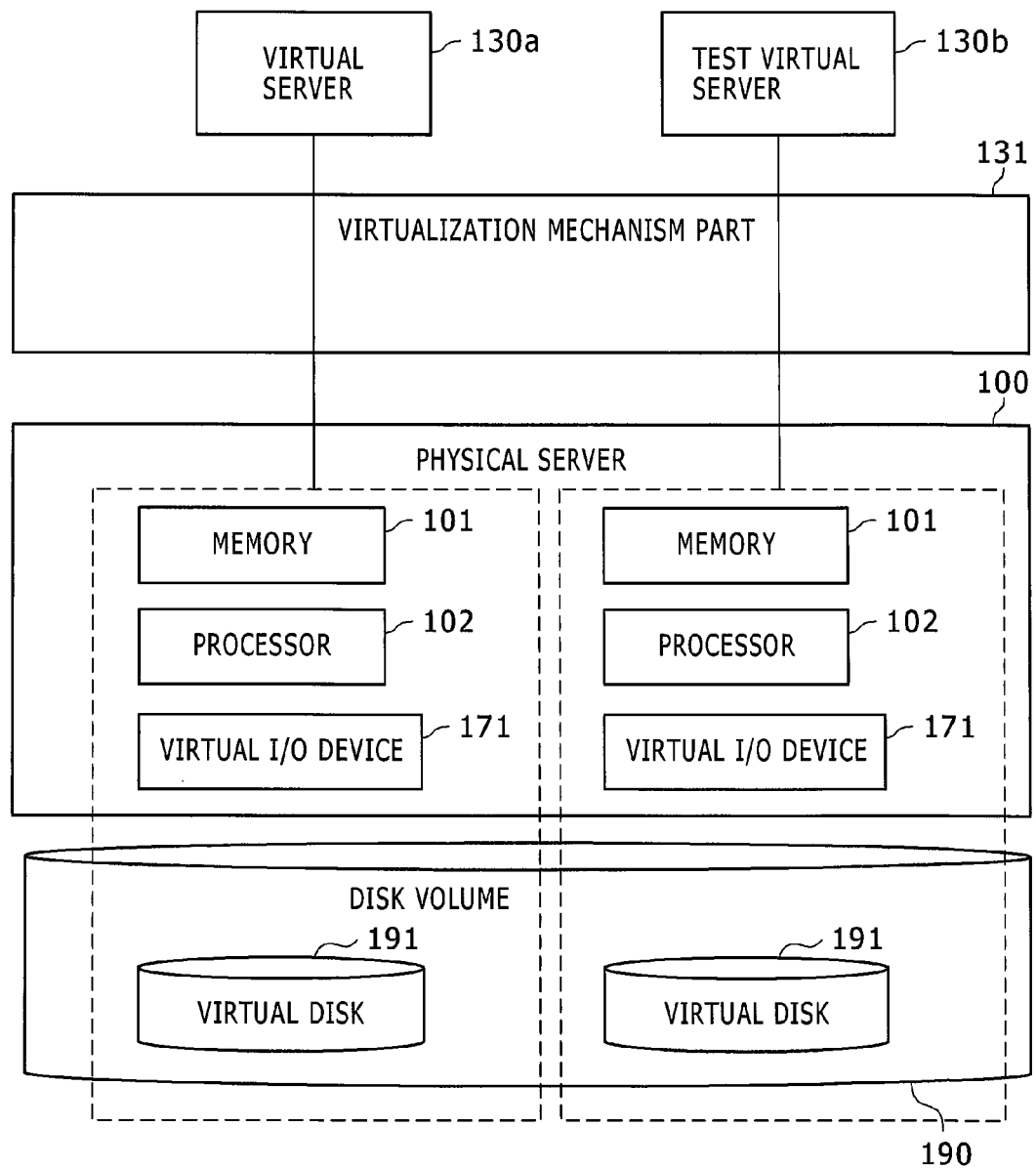
FIG. 4 is a detailed view of the relationship between the physical server adopting the virtual server and the test virtual server as shown in FIG. 3, and a disk apparatus.

FIG. 3 is a detailed block diagram of the physical server applying the virtual server and the test virtual server. FIG. 4 is a detailed view of the relationship between the physical server applying the virtual server and the test virtual server as shown in FIG. 3, and the disk apparatus. The physical server 100c (100) includes a memory 101, a processor 102, a user I/F 103, a network I/F 104, and a disk I/F 105.

The memory 101 includes a virtualization mechanism part 131 (including the current virtual server 130a, and the test virtual server 130b to test whether it should be applied as the server on the network). An OS (Operating System) 301 of the memory 101 includes a comparison information acquisition part 310 (see FIG. 20), a server relationship information acquisition part 311 (see FIG. 21), and a resource information acquisition part 312 (see FIG. 23).

Further, the storage apparatus 180 (see FIG. 1) including a plurality of disk volumes 190 is connected to the physical server 100c. The disk volume 190 includes a plurality of virtual disks 191 through a virtual I/O device 171 (see FIG. 4). Note that the storage apparatus 180 (see FIG. 1) may be formed in the server, or may be an external apparatus through a fiber channel and the like.

In response to an instruction of the resource placement improvement part 206 of the management server 200 (see FIG. 2), the virtualization mechanism part 131 allocates the processor 102, the memory 101, the virtual disk 191, and the virtual I/O device 171 to the virtual server 130a and the test virtual server 130b, respectively. The resources allocated to the virtual server 130a are changed when the configuration of the virtualization mechanism part 131 is changed by the resource placement improvement part 206 of the management sever 200 (see FIG. 2).

The test virtual server 130b is the virtual server prepared for the comparison with the current virtual server 130a, by the test improvement part 208 of the management server 200 (see FIG. 2) based on the extraction probability Ep of the resource information table 211 (see FIG. 7).

Figure 5:
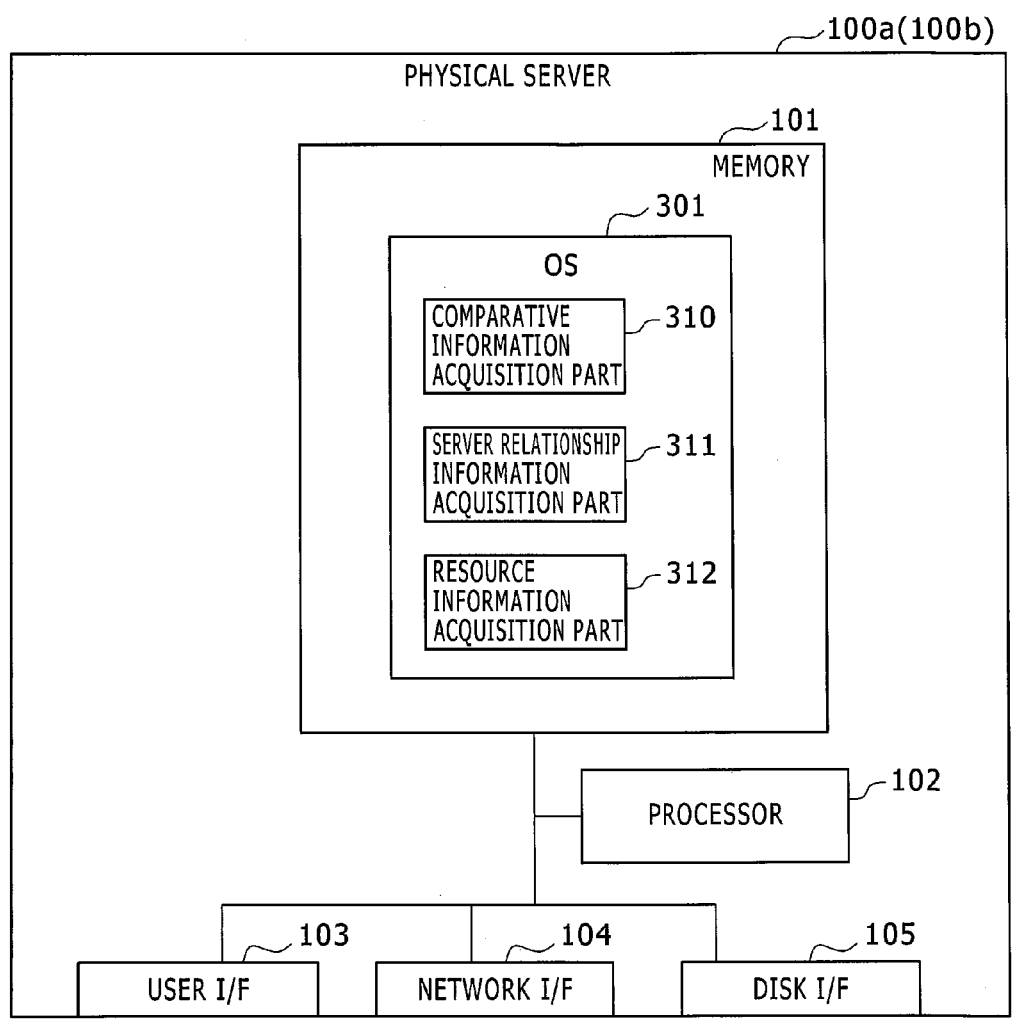
FIG. 5 is a detailed block diagram of the physical server and a test physical server.

FIG. 5 is a detailed block diagram of the physical server and the test physical server. FIG. 5 shows the configuration of the current test physical server 100a shown in FIG. 1, as well as the test physical server 100b to test whether the test physical server 100b should be applied as the server on the network. The OS 301 of the memory 101 includes the comparison information acquisition part 310 (see FIG. 20), the server relationship information acquisition part 311 (see FIG. 21), and the resource information acquisition part 312 (see FIG. 23).

Figure 6:
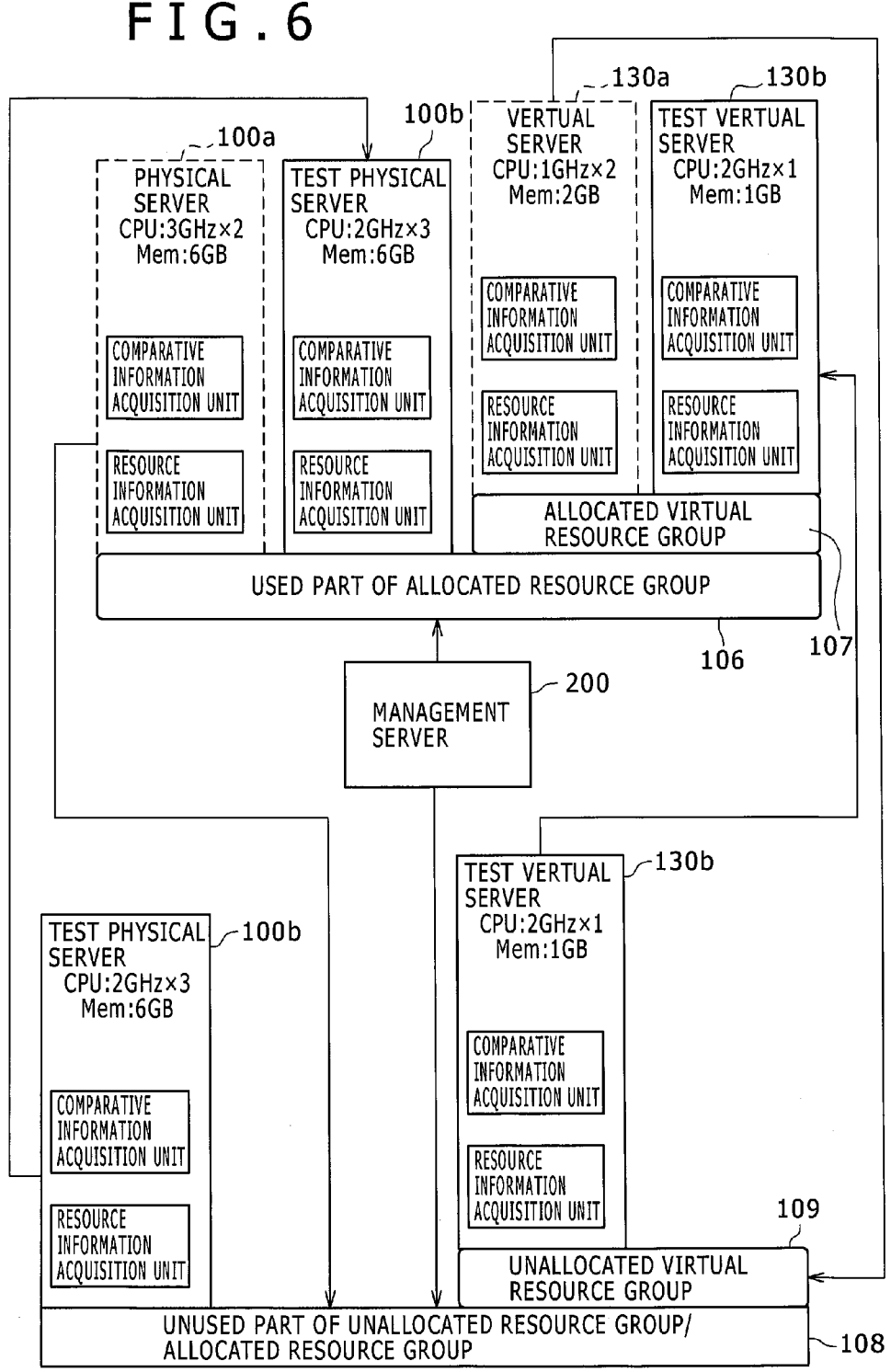
FIG. 6 is a schematic view of the relationship of the reallocation of the resources when the test physical server and the test virtual server are adopted with improvements through tests.

FIG. 6 is a schematic view of the relationship of the reallocation of the resources when the test physical server and the test virtual server are adopted with an improvement through tests. This will be described with reference to FIG. 2 if necessary. The information collection part 210 (see FIG. 15) of the management server 200 obtains an unused part of unallocated and allocated resource groups 108. The resource placement improvement part 206 generates the test physical server 100b on the unused part of unallocated and allocated resource groups 108, and the test virtual server 130b on an unallocated virtual resource group 109. The resource placement improvement part 206 compares the performance of the generated test physical server 100b with the performance of the current physical server 100a.

Similarly, the resource placement improvement part 206 compares the performance of the generated test virtual server 130b and the performance of the current virtual server 130a. Then, when the resource placement improvement part 206 determines to adopt the generated test physical server 100b and the generated test virtual server 130b, the improved placement application part 209 moves the test physical server 100b to a used part of allocated resource group 106. Also, the improved placement application part 209 moves the test virtual server 130b and the resources allocated to these servers, to the allocated virtual resource group 107. Then, the improved placement application part 209 moves the current physical server 100a, the virtual server 130a, and the resources allocated to these servers to the unused part of unallocated and allocated resource groups 108. In this way, the improvement of resource allocation is achieved.

The features of the present application will be described with reference to FIG. 6. For example, the current physical server 100a and the virtual server 130a, shown in FIG. 6, are the servers generated by selecting resources meeting the conditions configured by the administrator. On the other hand, the test physical server 100b and the test virtual server 130b are the servers generated by randomly selecting resources. Thus, the performance of the test physical server 100b which has 3 CPUs (Central Processing Unit, processor)(2 GHz) can be improved more than the configuration of the current physical server 100a which has 2 CPUs (3 GHz), which was found by chance. As described above, in the conventional technology, often the desired performance is not achieved by the combination of the assumed resources. However, in the present embodiment, it is possible to create a combination of resources that the administrator has not expected.

Next, each of the tables will be described. FIG. 7 shows an example of the resource information table and a usage graph. FIG. 7(a) shows an example of the resource information table 211, and FIG. 7(b) shows an example of a usage graph 707 of the resource information table 211. The resource information table 211 shown in FIG. 7(a) is held by the management server 200, and updated based on the input information from the user I/F 203. The resource information table 211 contains resource name 701, type 702, virtual relationship 703, logical/eigenvalue configuration 704, physical position 705, allocation state 706, usage graph 707, presence/absence of failure 708, test information 709, and extraction probability Ep (710).

More specifically, if the resource name 701 is "FC1", the type 702 stores "FC" that represents a fiber channel device. The virtual relationship 703 stores information about the parent device that provides "virtual FC2" of the virtual FC device. The logical/eigenvalue configuration 704 stores "WWW (World Wide Name) information" that is used for the allocation of an external storage, and the like. The physical position 705 stores "I/O expansion device 1" which is the information of the device with "FC1". The allocation state 706 stores "Srv1" to which the resource is currently allocated. The usage graph stores "Graph1" in which the usage rates (the bandwidth for the FC) in the past time are recorded. The presence/absence of failure 708 stores "absent" which indicates that no failure has been found as a result of the tests of user specification and failure identification. The test information 709 stores "expansion", which is the type of test that the particular resource is finally subjected to (in which the order of the test that the target resource is subjected to is recorded in parentheses, in order to avoid duplication of the check in the test with the same improvement ID). The extraction probability Ep (710) shows the probability used to allocate FC1 to the server generated by the server group generation part 220 if FC1 is determined as the resource that can be allocated in each test.

As has been described above, the extraction probability Ep (710) is configured with the initial value 50%, which is updated by the process of the change of the extraction probability Ep in the resource placement improvement part 206 each time the test is performed. The extraction probability Ep has a value greater than 0% and less than or equal to 100% which is the probability to determine the presence or absence of resource use in the server group generation part 220.

The usage graph shown in FIG. 7(b) is, for example, a graph of the CPU usage, showing that the usage rate changes with time.

In the present embodiment, the probability is used for the allocation to the server generated by the server group generation part 220. More specifically, this means that the extraction probability Ep (710) is compared with the probability generated by the random number generation part 221, with respect to each of the resources contained in the resource information table 211, in order to apply the particular resource to the server to be generated if the extraction probability Ep is greater than the probability generated by the random number generation part 221.

FIG. 8 is a view showing an example of the improved resource information table. The improved resource information table 212 is held by the management server 200, which is updated based on the information about the test physical server 100b adopted by the resource reservation and test improvement part 207 (see FIG. 2), and on the information about the test virtual server 130b. The improved resource information table 212 contains resource name 801, type 802, virtual relationship 803, logical/eigenvalue configuration 804, physical position 805, allocation state 806, and presence/absence of failure 808.

The resource name 801, the type 802, the virtual relationship 803, the logical/eigenvalue configuration 804, the physical position 805, the allocation state 806, and the presence/absence of failure 808, shown in FIG. 8, correspond to the resource name 701, the type 702, the virtual relationship 703, the logical/eigenvalue configuration 704, the physical position 705, the allocation state 706, and the presence/absence of failure 708 shown in FIG. 7.

FIG. 9 is a view showing an example of the history table. The history table 213 contains resource information updated date 901 which is the date and time when the information collection part 210 (see FIG. 2) updated the resource information, number of resource changes 902, and number of relationship changes 903. The number of changed resources 902 is the frequency how often the resource information table 211 is changed. The number of relationship changes 903 is the frequency how often the server relationship table 214 (see FIG. 10) is changed.

Figure 16:
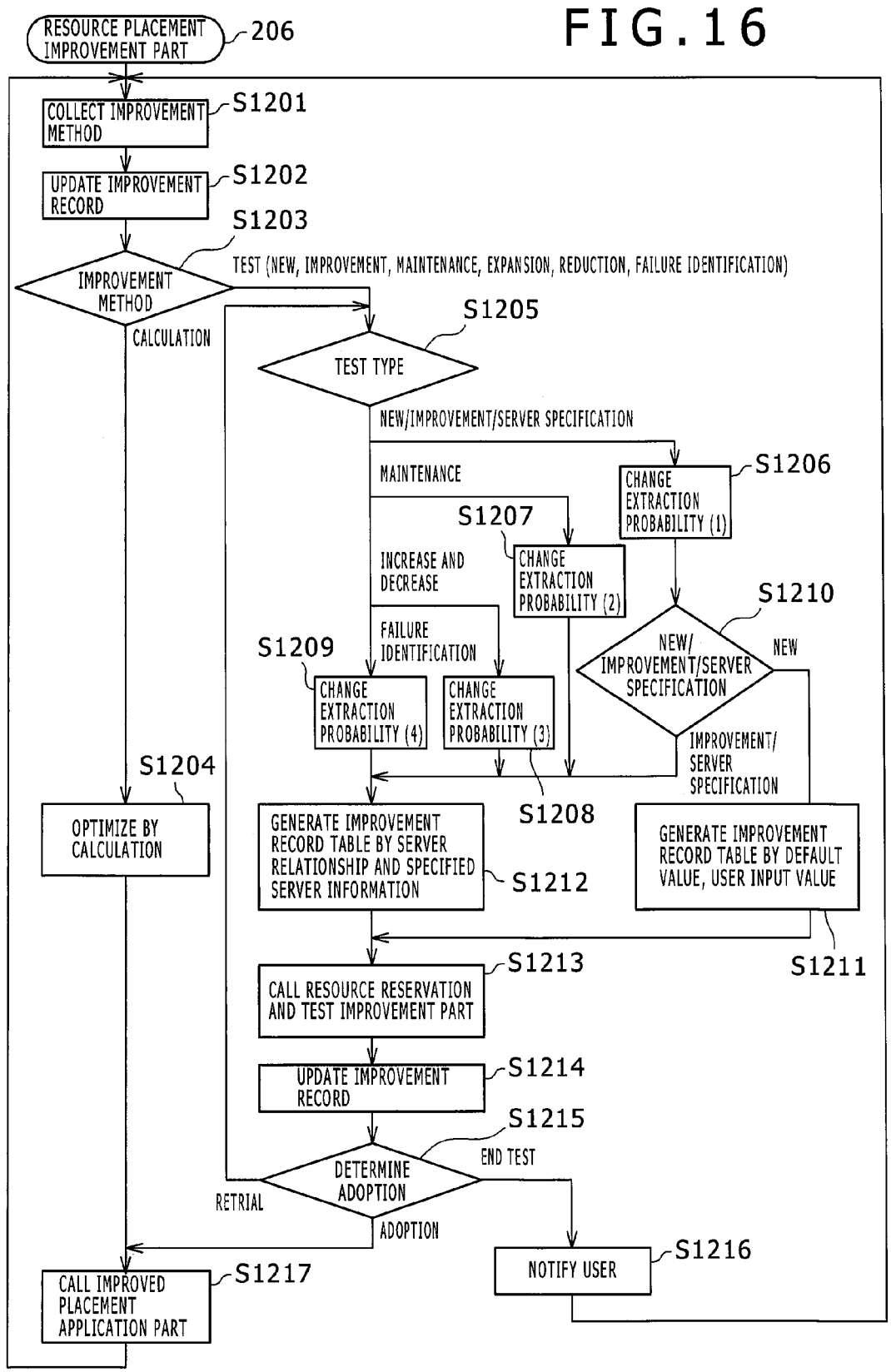
FIG. 16 is a flow chart of the process of a resource placement improvement part.

In the process of the collection of the improvement method in step S1201 shown in FIG. 16, the resource placement improvement part 206 can refer to the history table 213 to select the improvement method in such a way that the resource placement improvement by test is selected if the change frequency is high, and the resource placement improvement by calculation is selected if the frequency is low.

FIG. 10 is a view showing an example of the server relationship table. The description will be made with reference to FIGS. 3 and 5 if necessary. The server relationship table 214 is generated based on the information collected by the information collection part 210, namely, based on the information obtained from the server relationship information acquisition part 311, the resource information acquisition part 312, and a virtual allocation information acquisition part 313, or based on the information input from the user I/F 203. The server relationship table 214 contains server name 1001 of each server, resource sharing 1002 that indicates the server sharing the resource, intercommunication 1003 that indicates the server communicating with each other, and start time 1004 that indicates the server with the same start time. More specifically, it can be found that in the case of the server name "Srv1", the server shares the resource with the server "Srv2", communicates with the server "Srv3", and has substantially the same start time as the server "Srv6".

FIG. 11 is a view showing an example of the job management table. The job management table 215 is the table of the job contents used for the test improvement part 208 (see FIG. 2) to compare each of the running servers. The job management table 215 contains job ID 1101, job contents 1102, comparative value 1103, and determination method 1104 used for the comparison.

More specifically, in the case of Job 1, Job A is performed and the result is determined to be adopted if the job can be performed without problems. In the case of Job 2, Job B is performed and the time is measured. Then, the result is determined to be adopted if the execution time is less than 5 seconds, which is the comparative value. In the case of Job 3, a data save is performed and the result is determined to be adopted if the data can be saved. In the case of Job 4, Job C is performed and the result is determined to be adopted if the job can be performed on all related servers without problems. In the case of Job 5, the communication test, such as PING, is performed and the result is determined to be adopted if the test server can communicate with all related servers. In the case of Job 6, an application program is executed and the result is determined to be adopted if a specific program can run without errors. In the case of Job 7, a memory load job is performed and the result is determined to be adopted if a result better than the load result 1 is recorded.

FIG. 12 is a view showing an example of the relationship table between improvement specifications and jobs. The improvement specification-job relationship table 218 contains improvement specification 1201 that is specified for the resource placement improvement, as well as job ID 1202. The job ID 1202 shown in FIG. 12 corresponds to the job ID 1101 shown in FIG. 11. The improvement specification 1201 is specified by the administrator through a management terminal (not shown). Then, the management server 200 performs the job ID 1202 corresponding to the improvement specification 1201, with respect to the test physical server 100b and the test virtual server 130b. Also, the management server 200 performs the job ID 1202 corresponding to the improvement specification 1201, with respect to the current physical server 100a and the current virtual server 130a as compared objects. In other words, the test improvement part 208 of the management server 200 specifies to the. comparison information acquisition part 310, and obtains the execution result.

More specifically, when "new" is specified, the management server 200 performs the job 1 and determines whether the job can be performed without problems by referring to the job management table 215. When "improvement" is specified, the management server 200 performs the job 2, and determines whether the time for the execution of the job can be reduced to less than the comparative value by referring to the job management table 215 shown in FIG. 11.

FIG. 13 is a view showing an example of the job result management table. The job result management table 216 is updated by the information collected by the test improvement part 208 of the management server 200. Then, the comparison information acquisition part 310 holds the resource combination in which the job of each improvement ID is performed, the job, and the job result history. The job result management table 216 contains improvement ID 1301, server group 1302, resource 1 (1303), resource 2 (1304), resource 3 (1305), resource 4 (1306), job ID 1307, and job result 1308.

More specifically, in the case of Test 1, the server of "Srv3" is configured by combining the resources of CPU1, Mem1, HDD1, and LAN1, in which the job 3 and the job 6 are performed. As a result, it is found that the application operation is successful. In the case of Test 2, the virtual server "VSrv2" is configured by combining the resources of VCPU2, Vmem2, VHDD2, and VFC2, in which the job 2 is performed. As a result, it is found that the job failed due to time out or other reasons.

FIG. 14 is a view showing an example of the improvement record table. The improvement record table 217 is a table for storing the improvement record when the test improvement part 208 performs an improvement by test. The improvement record table 217 contains improvement ID 1401, improvement specification 1402 for determining the type of test, adoption configuration 1403 for storing the improvement target for all server and resource groups which are managed objects, information collection policy 1404, server group 1405 to be improved, server group relationship 1406, success or failure 1407, test excess determination 1408 that indicates the time for the termination of improvement by test, the repeat count and the like, and test repeat count 1409.

More specifically, in the resource placement improvement part 206, "Test 1" with the improvement ID 1401 is generated in the improvement record update process in step S1202 shown in FIG. 16. Then, when the user (including the administrator) specifies "maintenance" and "Srv3" as the improvement by test in the selected information collection process in step S1201, "maintenance, Srv3" is stored in the improvement specification 1402. The test improvement part 208 performs the process of calling the comparative information acquisition part 310 in step S1403 shown in FIG. 18, from the improvement specification-job relationship table 218 (see FIG. 12) based on the information of the improvement specification 1402. In this way, the job to be performed by the comparative information acquisition part 310 is determined.

The adoption configuration 1403 stores "resource minimum" according to the user specification. The information of the adoption configuration 1403 is used when the test improvement part 208 selects from a plurality of improved servers found in the process of comparing with the current server in step S1404 shown in FIG. 18, with respect to the server group generated by the server group generation part 220.

The information collection policy 1404 stores the specification (for example, "regular") provided by the user. The information collection policy 1404 may be automatically configured when the information collection part 210 performs the process of the configuration of the information acquisition policy in the next step S1101 (see FIG. 15). In this case, it is preferable to obtain the policy adopted in the improvement with "success" stored in the success or failure 1407 in the improvement record table 217, from the column of the information collection policy 1404, and use the obtained policy for the adoption.

When the server is specified in the improvement specification 1402, the related server is stored in the server group 1405 from the server relationship table 214 (see FIG. 10). When the resource is specified, the management server 200 identifies the server to which the particular resource is allocated, from the resource information table 211. Then, the management server 200 stores the related server from the sever relationship table 214. In the case of Test 1 shown in FIG. 14, "Srv1, Srv2" with a relationship described in the row of "Srv3" of the server relationship table 214, are stored together with "Srv3".

The information of the server group 1405 is used throughout the process for the sizing of each part, the reduction of the convergence time until the improvement result is obtained, or other purposes. In order to remove the migrated object based on the information of the server relationship table 214 due to factors such as the failure of the improvement placement migration, the server of the server group 1405 is removed.

The server group relationship 1406 records the items related to the server relationship table 214 referred to when the server is stored in the server group 1405. In the case of Test 1 shown in FIG. 14, "intercommunication" and "start time", whose values are given in the row of "Srv3" of the server relationship table 214, are stored.

The success or failure 1407 stores the information about whether the improvement with the improvement ID 1401 is successful or failed by the process of updating the success of failure of the improvement record in step S1214 shown in FIG. 16. In the case of Test 1, the execution time exceeds the time of the excess determination 1408, so that the test improvement part 208 stores "time out (the time required is 107 hours)" in the process of the time limit and the maximum number of times in step S1406 shown in FIG. 18.

The excess determination 1408 stores the user specification, the default time or number of times. In the case of Test 1, the default value has been configured to 100 h (100 hours). The improved placement is not found within 100 h, so that it is determined that the time runs out in the process of the time limit and maximum number of times in step S1406 of the test improvement part 208 shown in FIG. 18. Thus, the success or failure 1407 is updated to "time out".

Further more specifically, in the case of Test 1 shown in FIG. 14, the management server 200 performs the test of "maintenance" of "Srv3" on a "regular" basis. The management server 200 forms the test physical servers "Srv1", "Srv2", and "Srv3", which are present in the server group 1405 in the combination of resources, to test data saving of the job3. As a result, it is found that the data may not be stored. However, when a resource shortage occurs in the migration of the group of the test physical server 100*b* to the group of the current physical server 100*a*, the server as the migrated object is removed in step S1506 of the improved placement application part 209 (see FIG. 19) to perform the migration. The details of this step will be described later.

In the case of Test 2, the management server 200 performs the test of "improvement" of "VSrv1" with "monitor". The management server 200 forms the virtual servers for practical use, "VSrv1" and "VSrv2" in the server group 1405, by combining the resources. Then, the management server 200 measures the execution time of Job B for the job 2. However, it can be found that the virtual servers are not improved. Note that when "resource aggregation" is specified as the adoption configuration 1403, and when a plurality of resource applications that can be improved are found, which means that the management server 200 adopts the configuration in which a large number of resources with the same physical position are allocated.

In the case of Test 3, the management server 200 forms the test physical server "Srv5" and performs Job C for the job 4. As a result, it can be found that the job is successfully done.

In the case of Test 4, the management server 200 forms three test physical servers and performs Job A for the job 1. In this case, it can be found that the job is successfully done.

Next, each process flow will be described. FIG. 15 is a flow chart of the process of the information collection part. The description will be made with reference to FIGS. 2, 3, and 5 if necessary. The information collection part 210 collects the resource information from the server relationship information acquisition part 311, the resource information acquisition part 312, and the virtual allocation information acquisition part 313 that are provided in each server. When the server is not managed by the management server 200, the process of placing the server relationship information acquisition part 311, the resource information acquisition part 312, and the virtual allocation information acquisition part 313 is performed. Note that the process of predetermined steps (for example, step S1102, step S1106) should be performed as far as the time permits. When the time reaches a predetermined or user specified time, the information collection part 210 terminates the process and proceeds to the next step.

The information collection part 210 configures the policy for information acquisition (for example, performing on a regular basis or through monitoring) by the input value from the user I/F 203, or by the information collection policy 1404 in which the result in the success or failure column of the improvement record table 217 (see FIG. 14) tends to be successful (step S1101). The server relationship information acquisition part 311, the resource information acquisition part 312, and the virtual allocation information acquisition part 313 collect resource information, respectively, based on the policy configured as described above.

The information collection part 210 detects a server (step S1102). The resource information acquisition part 312 and the server relationship information acquisition part 311 detect servers that are not applied or for which the information acquisition policy is not updated. With respect to the server to which a virtual server is applied, the virtual allocation information acquisition part 313 detects the unused physical server 100*c* (see FIG. 3) that is not applied.

The information collection part 210 places the individual information acquisition parts to the server detected in step S1102 (step S1103). More specifically, the information collection part 210 push installs the server relationship information acquisition part 311, the resource information acquisition part 312, and if necessary, the virtual allocation information acquisition part 313, to the server detected by the information collection part 211, by reflecting the configuration in step S1101. Note that the push installation means that the management server 200 remotely controls the target server on the network to install the necessary software and the like.

The information collection part 210 determines the policy configured in step S1101 (step S1104). If the result is resource monitoring (Monitor detected in step S1104), the process proceeds to step S1106. If it is configured to perform on a regular basis (Regular detected in step S1104), the process proceeds to step S1105.

In step S1105, the information collection part 210 obtains data on a regular basis. The information collection part 210 receives information regularly sent from the resource information acquisition part 312, the server relationship information acquisition part 311, and the virtual allocation information acquisition part 313.

In step S1106, the information collection part 210 waits for a response from the individual acquisition parts. The information collection part 210 receives information at any time from the resource information acquisition part 312, the server relationship information acquisition part 311, and the virtual allocation information acquisition part 313.

Based on the information acquired in steps S1105 and S1106, the information collection part 210 updates the resource information table 211 (see FIG. 7) and the server relationship table 214 (see FIG. 10) (step S1107).

The information collection part 210 updates the history table 213 (see FIG. 9) (step S1108). The information collection part 210 records the date and time updated in step S1107, as well as the number of resource information updates, into the history table 213. Then, the process returns to step S1101.

FIG. 16 is a flow chart of the process of the resource placement improvement part. FIG. 16 shows the details of the process of the resource placement improvement part 206. The resource placement improvement part 206 receives an improvement instruction, and collects an improvement method (step S1201). More specifically, the resource placement improvement part 206 confirms the resource information update date 901, the number of resource changes 902, and the number of server relationship changes 903. Further, the resource placement improvement part 206 checks the presence or absence of the period in which the operation of all the resources is stopped, from the usage graph of the resource information table 211 (see FIG. 7). Then, the resource placement improvement part 206 confirms that the improvement method has been specified from the user I/F 203.

The resource placement improvement part 206 updates the improvement record (step S1202). The resource placement improvement part 206 generates a row for the new improvement ID in the improvement record table 217 (see FIG. 14). Then, the resource placement improvement part 206 stores the improvement specification (for example, calculation or test) that is confirmed in step S1201, and the adoption criteria (corresponding to the adoption configuration 1403). If the number of resource changes 902 (see FIG. 9) is equal to or less than a prescribed value in step S1201 or if the period of stopping the operation of all the resources is present, without any specification from the user, the resource placement improvement part 206 stores calculation for the improvement specification.

In FIG. 16, the description will be limited to the tests in the improvement specifications of new, improvement, maintenance, expansion, reduction, and failure identification. Further, when the user specifies the target server, the server name is also included. The adoption criteria are specified by the user, in which resource minimum (which is the configuration of the minimum number of resources used in the tests), resource aggregation (which is the configuration in which the physical positions of the allocated resources of each server are close to each other), resource distribution (which is the configuration in which the physical positions of the allocation resources of each server are widely distributed), and the like, are stored. Note that new means that a new server is built according to the request of the user, instead of performing improvement.

The resource placement improvement part 206 determines the improvement method (step S1203). The resource placement improvement part 206 refers to the improvement record table 217 (see FIG. 14). If the result is calculation (step S1203, Calculation), the process proceeds to step S1204, and if the result is test (step S1203, Test), the process proceeds to step S1205, according to the improvement specification 1402 of the improvement ID generated in step S1202.

In step S1204, the resource placement improvement part 206 performs the optimization improvement process by calculation according to the known example (WO 2008-132924), and the like. The resource placement improvement part 206 updates the improvement record table 217 (see FIG. 14) and the improved resource information table 212 (see FIG. 8), based on the calculation result and the resource allocation information after improvement.

More specifically, the management server 200 uses the information about the performance and configuration of the application and device as parameters of the utility function. The management server 200 repeats function adjustment and solution derivation, according to the tendency of the improvement of the placement of the resources. In this way, the management server 200 obtains the optimal parameter values (including the optimal allocation information) by calculation. Then, the management server 200 derives the improved resource placement for the resources whose parameters can be easily found. If the resource placement can be derived, the management server 200 updates the improved resource information table 212 (see FIG. 8), in order to perform resource placement based on the information of the derived resource allocation. Further, the improvement record table 217 (see FIG. 14) is the information used for selecting the improvement method (calculation or test) in the next improvement, so that the management server 200 records the success or failure of the improvement by calculation into the improvement record table 217 (see FIG. 14).

In step S1205, the resource placement improvement part 206 determines the test type from the test contents of new, improvement, maintenance, expansion, reduction, and failure identification, and proceeds to the next step (steps S1206 to S1209). The next step is the branch step for adjusting the extraction probability Ep of the resource information table 211 (see FIG. 7).

In step S1206, in the case of new/improvement/server specification, the process (1) for changing the extraction probability Ep is performed. During the test of this improvement ID, the extraction probability Ep in the same table is changed according to the usage from the usage graph of the resource information table 211 (see FIG. 7), as follows.

When it is desired to move the allocated resources to one side, the extraction probability Ep of high usage resources is increased and the extraction probability Ep of low usage resources is reduced. It is possible to distribute by reversing the steps described above. Further, it is assumed that success information is stored in the column of the success or failure 1407 in the improvement record table 217 (see FIG. 14) and that there is a test of the improvement ID with the same content (the same number of servers, the same server relationship, and the like) as the server group column and the server group relationship column for the current improvement ID, with the required time and number of times smaller than those of the current improvement ID. In this case, the resource used by the particular server group is identified by the resource information table 211 (see FIG. 7), to increase the extraction probability Ep of the resource in order to speed up the convergence. Then, the process proceeds to step S1210.

Note that the number in parentheses in the column of the test information 709 of the resource information table 211 (see FIG. 7) is the number to record the order of the test that the target resource is subjected to, in order to avoid repeated checks in the test of the same ID.

In step S1207, in the case of maintenance, the process (2) of changing the extraction probability Ep is performed. The resource placement improvement part 206 changes the value of the column of the test information 709 of the resource information table 211 to "maintenance", with respect to the resource in the user specified maintenance server that is identified from the resource information table 211 (see FIG. 7). Further, the resource placement improvement part 206 reduces the extraction probability Ep of the resource with "maintenance", while increasing the extraction probability Ep for other resources. Then, the process proceeds to step S1212.

In step S1208, in the case of expansion/reduction (increase and decrease), the process (3) of changing the extraction probability Ep is performed. The resource placement improvement part 206 changes the value of the column of the test information 709 of the resource information table 211 (see FIG. 7) to "expansion (#)" and "reduction (#)", with respect to the resource that is randomly specified or is specified by the user in advance. Note that the number in parentheses (#) is used for determining whether the test is performed for all the resources. The resource placement improvement part 206 increases the extraction probability Ep for the resource with expansion, while reducing the extraction probability Ep for other resources. The resource placement improvement part 206 reduces the extraction probability Ep for the resource with reduction, while increasing extraction probability Ep for the other resources. Then, the process proceeds to step S1212.

In step S1209, in the case of failure identification, the process (4) of changing the extraction probability Ep is performed. The resource placement improvement part 206 changes the test information of the resource in the same physical position as the resource with "present", which is given in the column of the presence or absence of failure of the resource information table 211 (see FIG. 7) in step S1216, based on the previous user input, the failure information received from the management software, or the previous test of failure identification, to "failure (#)". Then, the resource placement improvement part 206 increases the extraction probability Ep of the particular resource, while reducing the extraction probability Ep for other resources. If there is no specific information used for selection, the resource placement improvement part 206 randomly selects a resource, changes the test information of the resource in the same physical position including the resource, to "failure (#)", and increases the extraction probability Ep of the particular resource. Then, the process proceeds to step S1212.

In step S1210, the resource placement improvement part 206 determines whether the test is new, improvement, or server specification. If the answer is new (step S1211, New), the resource placement improvement part 206 generates the improvement record table 217 (see FIG. 14) with the default value or the user input value (step S1211), and proceeds to step S1213. If the answer is improvement/server specification, the process proceeds to step S1212.

In step S1212, the resource placement improvement part 206 generates the improvement record table 217 according to the server relationship and the specified server information. If the specified server and resource, the resource placement improvement part 206 selects a server with a strong server relationship with the specified server and resource, and records the selected server in the column of the server group 1407 of the improvement record table 217. The resource placement improvement part 206 selects again in the process with the same improvement ID in such a way that the selected server does not belong to the group that has been selected from the history of the improvement record table 217 (see FIG. 14).

The resource placement improvement part 206 calls the resource reservation and test improvement part 207 (see FIG. 17) (step S1213), and updates the column of the success or failure 1407 of the improvement record table 217 (see FIG. 14) (step S1214). If the test exceeds the time limit and the maximum number of times, the resource placement improvement part 206 updates the column of the success or failure 1407 to "failure", together with the information about the required time and number of times.

The other processes are different depending on the value of the column of the improvement specification 1402 of the improvement record table 217 (see FIG. 14).

(1) In the Case of New and Improvement:

When the resource allocation is completed for all the servers of the improved resource information table 212 (see FIG. 8), the resource placement improvement part 206 stores "improvement" in the column of the success or failure of the improvement record table 217 (see FIG. 14), together with the information about the required time and number of times.

(2) In the Case of Maintenance:

If there is no server allocated to the column of the allocation state 706 for all the resources with "maintenance" as the value of the column of the test information 709 of the resource information table 211 (see FIG. 7), the resource placement improvement part 206 stores "maintenance available" in the column of the success or failure 1407 of the improvement record table 217 (see FIG. 14), together with the information about the required time and number of times. In other words, this means the state in which the resource is not allocated to any server.

(3) In the Case of Expansion/Reduction:

If the usage of the resource with "expansion" in the column of the test information 709 of the resource information table 211 (see FIG. 7) is 100% or is equal to or greater than the user specified value, the resource placement improvement part 206 stores "expansion possible" in the column of the success or failure 1407 of the improvement record table 217 (see FIG. 14), together with the information about the required time and number of times. Similarly, if the usage of the resource with "reduction" in the column of the test information 709 of the resource information table 211 (see FIG. 7) is 0% or is equal to or less than the user specified value, the resource placement improvement part stores "reduction possible" in the column of the success or failure 1407 of the improvement record table 217 (see FIG. 14), together with the information about the required time and number of times.

In the present embodiment, if the usage of the resource is 100% or is equal to or greater than the user specified value, it is possible to record the recommendation of resource expansion into the improvement record table 217 (see FIG. 14). Similarly, if the usage of the resource is 0% or is equal to or less than the user specified value, it is possible to record the recommendation of resource reduction into the improvement record table 217.

If the number in parentheses (#) in the test information 709 is at the end, "expansion not possible" or "reduction not possible" is stored in the column of the success or failure 1407, together with the information about the required time and number of times. The number in parentheses (#) is used for determining whether the test is performed for all the resources. The test information 709 in the row of FC1 shown in FIG. 7 is the history that the resource is selected second as the target object with the improvement specification determined as "expansion". Further, the test information 709 of the row of LAN2 is the history that the resource is selected first with the improvement specification determined as "failure".

(4) In the Case of Failure Identification

If the information is not stored in the column of the allocation state 706 of the resource with "failure" as the value in the column of the test information 709 of the resource information table 211 (see FIG. 7), "failure (resource name)" is stored in the column of the success or failure 1407 of the improvement record table 217 (see FIG. 14), together with the information about the required time and number of times, to inform the user of the resource that has the possibility of failure. On the other hand, if the information is stored in the column of the allocation state 706 of the resource with # added at the end in the test information 709, "no failure" is stored in the column of the success or failure 1407 of the improvement record table 217 (see FIG. 14), together with the information about the required time and number of times.

The resource placement improvement part 206 determines adoption (step S1215). If the column of the success or failure 1407 of the improvement record table 217 (see FIG. 14) is blank (step S1215, Retrial), the process returns to step S1205. If the column of the success or failure 1407 of the improvement record table 217 is "failure", "expansion possible", "reduction possible", "expansion not possible", "reduction not possible", "failure (resource name)", or "no failure" (step S1215, End Test), the process proceeds to step S1216. If the column of the success or failure 1407 of the improvement record table 217 is "improvement" (step 1215, Adoption), the process proceeds to step S1217.

In step S1216, the resource placement improvement part 206 notifies the user. The resource placement improvement part 206 presents the information corresponding to "failure", "expansion possible", "reduction possible", "expansion not possible", "reduction not possible", "failure (resource name)", or "no failure", to the user. Then, the resource placement improvement part 206 updates the resource information table 211 (see FIG. 7). For example, in the case of "failure", the resource placement improvement part 206 stores "present" in the column of the failure 708 of the resource information table 211. In the case of "no failure", the resource placement improvement part 206 stores "absent" in the column of the failure 708 of the resource information table 211.

In step S1217, the resource placement improvement part 206 calls the improved placement application part 209 (see FIG. 19) to perform the improved placement. Then, the process returns to step S1201.

In the present embodiment, for example, if the number of times the test does not meet the determination method of the job exceeds a predetermined number of times, or if the time for the test that does not meet the determination method of the job exceeds a predetermined time, the management server 200 can notify the user that the resource placement may not be improved.

Figure 17:
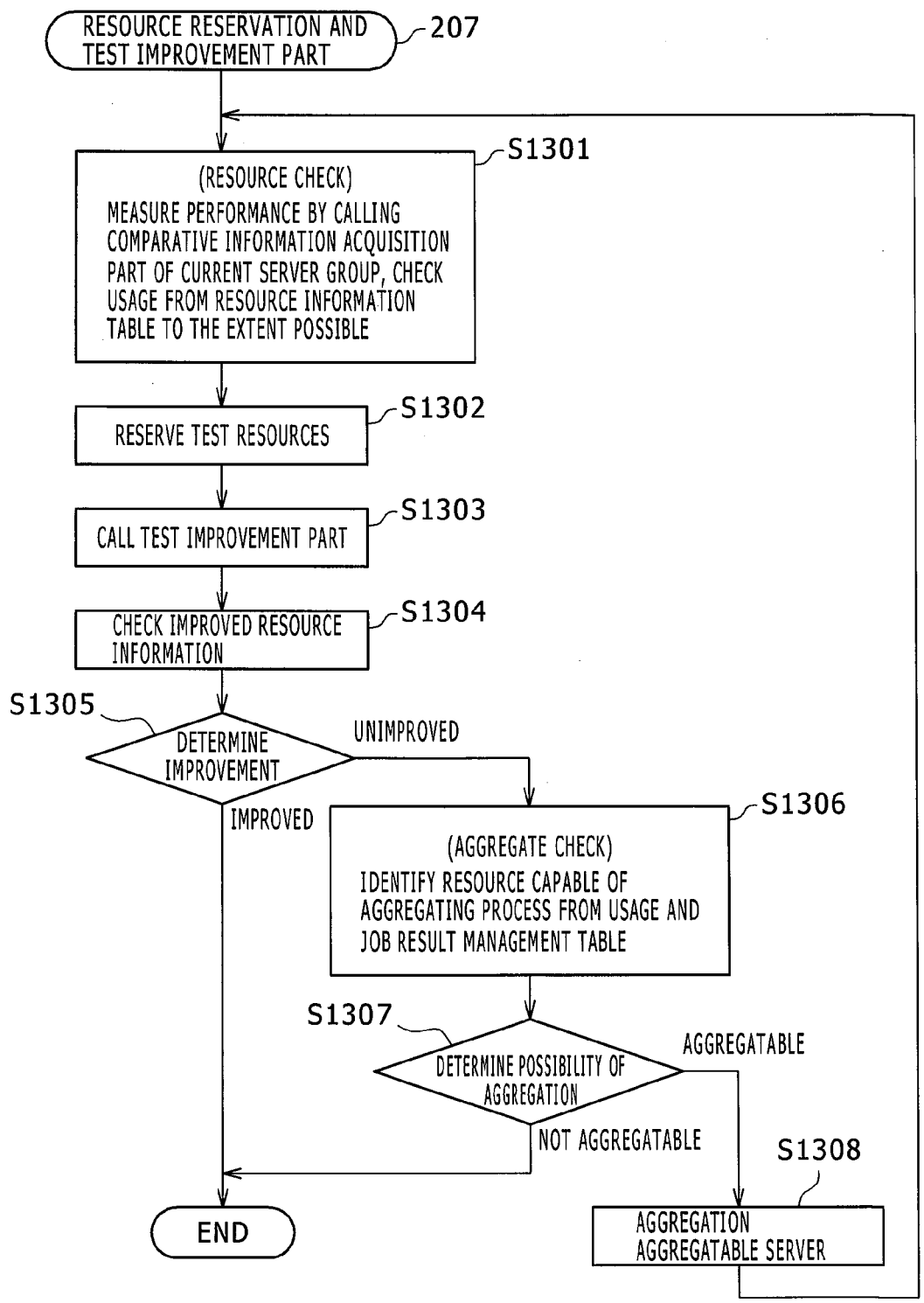
FIG. 17 is a flow chart of the process of a resource reservation and test improvement part.

FIG. 17 is a flow chart of the process of the resource reservation and test improvement part. FIG. 17 shows the details of the process of the resource reservation and test improvement part 207. Note that the process in a particular step (for example, step S1301) should be performed as far as the time permits. When the time reaches the predetermined or user specified time, the resource reservation and test improvement part 207 terminates the process and proceeds to the next step.

The resource reservation and test improvement part 207 calls the comparison information acquisition part 310 of the current server group, and measures the performance by a predetermined job to check the usage of the corresponding resource from the resource information table 211 (see FIG. 7) to the extent possible (step S1301). More specifically, the resource reservation and test improvement part 207 identifies the job necessary for the test of the performance of the resource that is allocated to the server in the column of the server group 1405 of the improvement record table 217 (see FIG. 14), based on the improvement specification 1402 and the improvement specification-job relationship table 218 (see FIG. 12). Then, the resource reservation and test improvement part 207 calls the comparative information acquisition part 310 for the server specified to the server group 1405, collects the results of the job, and updates the job result management table 216 (see FIG. 13). Further, the resource reservation and test improvement part 207 collects the resource usage from the usage graph 707 of the resource information table 211 (see FIG. 7).

The resource reservation and test improvement part 207 reserves the unallocated resource as the test resource, based on the resource information table 211 (see FIG. 7) (step S1302). The resource reservation and test improvement part 207 tries to reserve the test resource for a period of time (for example, 100 h (100 hours)) stored in the excess determination of the current improvement ID of the improvement record table 217 (see FIG. 14). Further, the resource reservation and test improvement part 207 reserves the unused part of the resource with no change in the past results in the usage graph of the resource information table 211 (see FIG. 7), as the test resource.

Further, if there is the improvement ID with the same information about the relationship between servers of the server group 1405 (the same number of servers, the same server relationship, and the like) in which the success information is stored in the column of the success or failure 1407, the resource reservation and test improvement. part 207 reserves the unused part of the resource with no change in the past results in the usage graph of the resource information table 211 (see FIG. 7), as the test resource.

The resource reservation and test improvement part 207 calls the test improvement part 208 (see FIG. 18) (step S1303), to perform the process of determining whether the test improvement can be achieved with the resource reserved in step S1302.

The resource reservation and test improvement part 207 refers to the improved resource information table 212 (see FIG. 8), to check the improved resource information on whether the improved resource is allocated to the server group of the improvement record table 217 (see FIG. 14) (step S1304).

The resource reservation and test improvement part 207 determines whether the improvement has been done (step S1305). If the resource is allocated in the improved resource information table 212 (see FIG. 8) to all the servers of the improvement record table 217 (see FIG. 14) in the improved resource information check in step S1304 (step S1305, Improved), the resource reservation and test improvement part 207 ends the process. If the resource is not allocated (step S1305, Unimproved), the process proceeds to step S1306.

The resource reservation and test improvement part 207 identifies the resource for which the process can be aggregated, from the resource usage and the job result management table (see FIG. 13) for the purpose of aggregate check (step S1306). In other words, the resource reservation and test improvement part 207 searches the server with the same result for the job from the job result 1308 as the job ID 1307 of the job result management table 216 (see FIG. 13), or the server with the same resource combination. Then, the resource reservation and test improvement part 207 refers to the usage graph 707 of the resource information table 211 (see FIG. 7), to check whether the sum of the graph has been over 100%. If the sum of the graph has not been over the value, the resource reservation and test improvement part 207 determines that the server using the compared resources can be aggregated into one of the resources.

The resource reservation and test improvement part 207 determines whether aggregation is possible (step S1307). If there is an aggregatable server (step S1307, Aggregatable), the process proceeds to step S1308. If there is no aggregatable server (step S1307, Not Aggregatable), the resource reservation and test improvement part 207 determines that the aggregation is not possible and ends the process.

In step S1308, in the aggregate check in step S1306, the resource reservation and test improvement part 207 aggregates the servers determined to be aggregatable. In other words, the resource reservation and test improvement part 207 can allow the servers to reside on the same resource in order to increase the number of unallocated resources.

FIG. 18 is a flow chart of the process of the test improvement part. The test improvement part 208 generates (creates)

a server group, places the comparative information acquisition part 310 to the generated server group, and compares the performance between the current server group and the generated test server group, in order to perform the process of determining whether the server group is improved, and the like.

The test improvement part 208 calls the server group generation part 220 (see FIG. 24) (step S1401). In other words, the test improvement part 208 push installs the comparative information acquisition part 310 to each test server group generated by the server group generation part 220.

The test improvement part 208 calls the comparative information acquisition parts of the current server group and the test server group (step S1403). More specifically, the test improvement part 208 identifies the job based on the improvement specification-job relationship table 218 (see FIG. 12), from the column of the improvement specification 1402 corresponding to the current improvement ID, and from the column of the server group 1405 in the improvement record table 217 (see FIG. 14). Then, the comparative information acquisition part performs the job on each of the test servers, and stores the results collected after the job is performed into the job result management table 216 (see FIG. 13).

The test improvement part 208 compares the job results between the current server group and each test server group in the job result management table 216 (see FIG. 13) (to determine whether the execution time for the job is reduced and the resource usage is reduced, and the like), based on the information in the column of the determination method 1104 of the job management table 215 (see FIG. 11), and on the information in the column of the adoption configuration 1403 of the improvement record table 217 (see FIG. 14) (step S1404). Thus, the test improvement part 208 determines to be adopted or not. If it is determined to be adopted, the test improvement part 208 stores the resource allocation information of the test server into the improved resource information table 212 (see FIG. 8). Further, it is also possible to update the comparative value according to the determination method of the job management table 215 (see FIG. 11) at the time of adoption.

If all the test servers are adopted as a result of the comparison in step S1404 (step S1405, Without Unimproved Server), the test improvement part 208 ends the process. If there is a server not adopted (in step S1405, With Unimproved Server), the process proceeds to step S1406.

In step S1406, if the time limit or the maximum number of times is equal to or greater than the content of the column of the excess determination 1408 of the improvement record table 217 (see FIG. 14) (step S1406, Exceed), the test improvement part 208 ends the process, and if not exceed (step S1406, Not reach), the process returns to step S1401.

More specifically, in the case of Test 1, the test improvement part 208 generates test servers "Srv1", "Srv2", "Srv3" for the current servers "Srv1", "Srv2", "Srv3". Then, the test improvement part 208 compares the current server "Srv1" with the test server "Srv1", the current server "Srv2" with the test server "Srv2", and the current server "Srv3" with the test server "Srv3", respectively. The test improvement part 208 can generate test server groups and repeat the performance comparison between the current server group and the test server group until improvement results can be obtained in all these comparisons. If the performance of the test server group is improved more than the performance of the current server group, the test improvement part 208 applies the test server group as the servers on the network.

FIG. 19 is a flow chart of the process of the improved placement application part. The improved placement application part 209 performs migration check from the surface integral of the resource usage, to determine the possibility of future migration by the tendency of the resource usage in the past (step S1501). The improved placement application part 209 calculates the surface integral with respect to the destination resource in the improved resource information table 212 (see FIG. 8), and with respect to the resource of the same type allocated to the server of the server group 1405 of the improvement record table 217 (see FIG. 14), based on the usage graph 707 of the resource information table 211 (see FIG. 7). Then, the improved placement application part 209 compares the difference between them. If there is a difference in the result in the column of the job result 1308 of the job result management table 216 (see FIG. 13), which is obtained by the servers before and after improvement (the current server and the test server), the area value is multiplied by the rate based on the performance difference in order to take into account the difference in the comparison of areas. For example, in the case of the job of measuring the communication speed, the surface integral of the usage is multiplied by the speed ratio to obtain the value for the comparison.

More specifically, if the resource has the result that can be compared with the same job ID in the job result management table 216 (see FIG. 13), it is possible to compare the result reflected in the area value. It is assumed that the surface integral of the usage graph of LAN1 is "50 (the percent sum of 24 h)" and the surface integral of the space in the usage graph of LAN2 is "30 (the percentage sum of 24 h)". In this case, if there is a difference in the performance between LAN1 and LAN2, and when the performance of LAN2 is 5/3 times or more the performance of LAN1, then it is determined that the LAN2 can be the destination of LAN1 as long as it is alternately switched to the virtual LAN on LAN2 and the other server using LAN2.

The improved placement application part 209 determines whether the migration is possible from the difference of the surface integrals in step S1501 (step S1502). With respect to the difference of the surface integrals, if the surface integral of the usage graph is less than the value of the current resource for all destination resources (step S1502, Migration), the process proceeds to step S1503. If the value is greater for at least one of the destination resources (step S1502, Migrated Object Change), the process proceeds to step S1504.

In step S1504, the improved placement application part 209 determines the server relationship (step S1504). If there is no value in the column of the server relationship 1406 of the improvement record table 217 (see FIG. 14) (step S1504, No relationship), the process proceeds to S1505. If there is a value (step S1505, with relationship), the process proceeds to step S1506.

In Step S1506, the improved placement application part 209 performs the process of changing the server group. More specifically, the server group shown in the column of the server group 1405 (see FIG. 14) is determined by the logical sum from the server relationship table 214 shown in FIG. 10, based on the information described in the column of the server group relationship 1406. Thus, the number of entries is reduced from the column of the server group relationship 1406, so that the number of servers in the content of the column of the server group 1405 is also reduced. Further, if the containment relationship can be found from the server relationship table 214 shown in FIG. 10, it is possible to change the content of the column of the server group relationship 1406 to the server relationship in which the number of servers is reduced, to reduce the number of servers in the content of the column of the server group 1405 in order to try to change to the size that can be migrated.

In step S1503, the improved placement application part 209 migrates the resources according to the improved resource information table 212 (see FIG. 8). After the migration, the improved placement application part 209 updates the allocation state 706 of the resources allocated to the resource information table 211 (see FIG. 7).

In step S1505, the improved placement application part 209 updates the change in the extraction probability Ep or the non-migratable information. If the resource is allocated in the configuration remaining in the improved resource information table 212 (see FIG. 8) and if the migration may not be possible because of the difference of the surface integrals in step S1501, the improved placement application part 209 updates the column of the success or failure 1407 of the improvement record table 217 (see FIG. 14) to "non-migratable", together with the information about the required time and number of times. Further, the improved placement application part 209 reduces the extraction probability Ep corresponding to the resource in the resource information table 211 (see FIG. 7). Alternatively, the improved placement application part 209 can notify the user of the resource that is recommended to be expanded.

Figure 20:
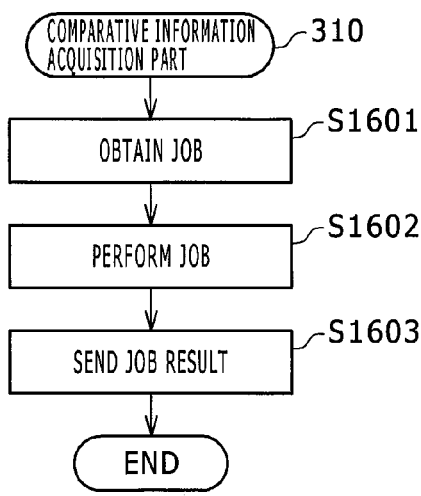
FIG. 20 is a flow chart of the process of a comparative information acquisition part.

FIG. 20 is a flow chart of the process of the comparative information acquisition part. The comparative information acquisition part 310 obtains a job sent from the management server 100 (step S1601), performs the obtained job (step S1602), sends the job result required for the determination method 1104 of the job management table 215 (see FIG. 11) to the test improvement part 208 of the management server 100 (step S1603), and ends the process.

Figure 21:
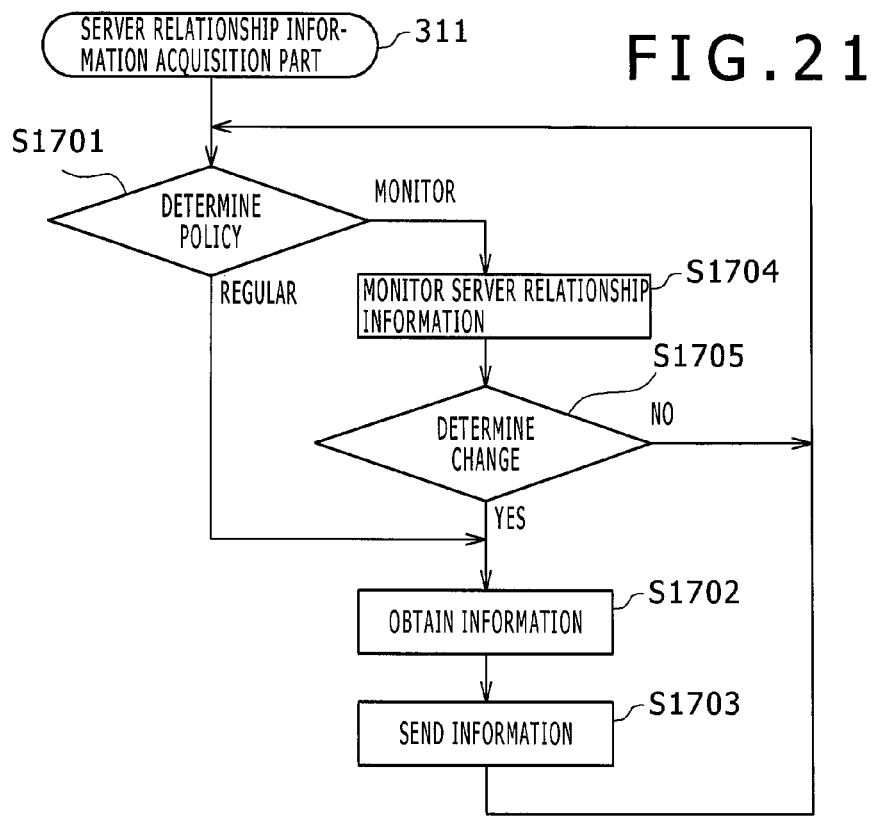
FIG. 21 is a flow chart of the process of a server relationship information acquisition part.

FIG. 21 is a flow chart of the process of the server relationship information acquisition part. The server relationship information acquisition part 311 determines the policy configured in the push installation by the information collection part 210 of the management server 200 (step S1701). If the policy is regular (step S1701, Regular), the process proceeds to S1702, and if monitor (step S1701, Monitor), the process proceeds to step S1704.

In step S1702, the server relationship information acquisition part 311 obtains information on the contents of the items in the server relationship table 214 (see FIG. 10), from the device information of the particular server of the OS and the management software. Then, the server relationship information acquisition part 311 sends the obtained information to the information collection part 210 of the management server 200 (step S1703). Then, the process returns to S1701. The next performance of step S1701 is after a predetermined time has passed.

In step S1704, the server relationship information acquisition part 311 monitors whether there is a change in the items contained in the information of the server relationship table 214 (see FIG. 10) to determine the presence of a change (step S1705). If there is a change in the information (step S1705, Yes), the process proceeds to step S1702. If there is no change in the information (step S1705, No), the process returns to step S1701.

Figure 22:
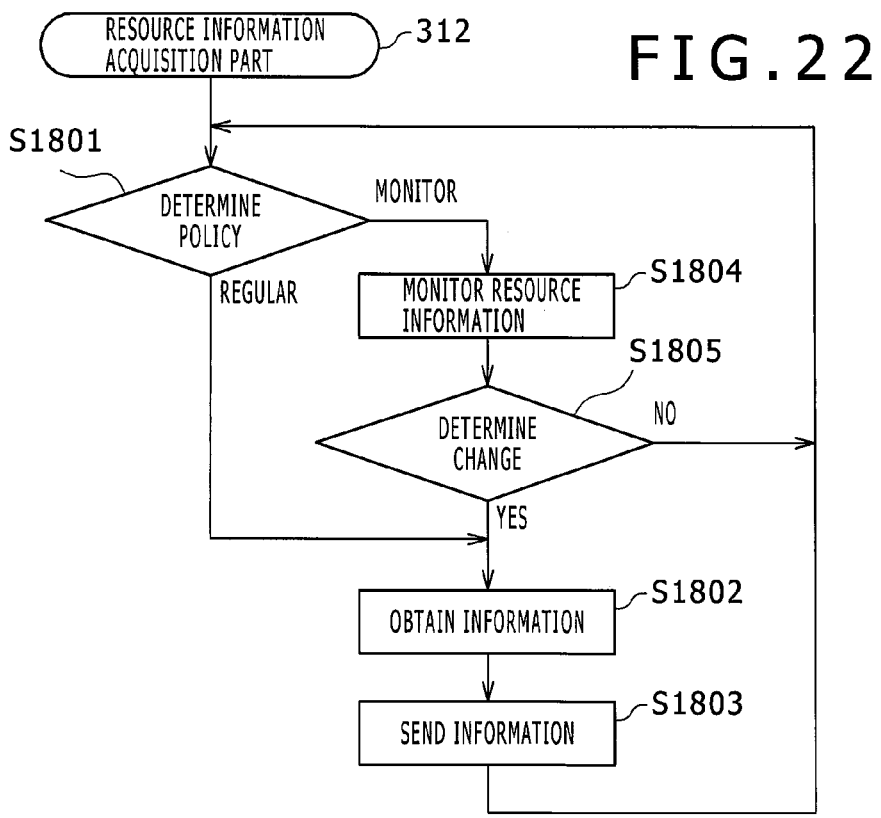
FIG. 22 is a flow chart of the process of a resource information acquisition part.

FIG. 22 is a flow chart of the process of the resource information acquisition part. The resource information acquisition part 312 determines the policy configured in the push installation by the information collection part 210 of the management server 200 (step S1801). If the policy is regular (step S1801, Regular), the process proceeds to step S1802, and if monitor (step S1801, Monitor), proceeds to step S1804.

In step S1802, the resource information acquisition part 312 obtains information on the contents of the items in the resource information table 211 (see FIG. 7) from the device information of the particular server of the OS and the management software. Then, the resource information acquisition part 312 sends the obtained information to the information collection part 210 of the management server 200 (step S1803). Then, the process returns to step S1801. The next performance of step S1801 is after a predetermined time has passed.

In step S1804, the resource information acquisition part 312 determines the presence or absence of a change by monitoring the resource information (for example, addition and reduction of a resource) (step S1805). If there is a change in the information (step S1805, Yes), the process proceeds to step S1802. If there is no change (step S1805, No), the process returns to step S1801.

Figure 23:
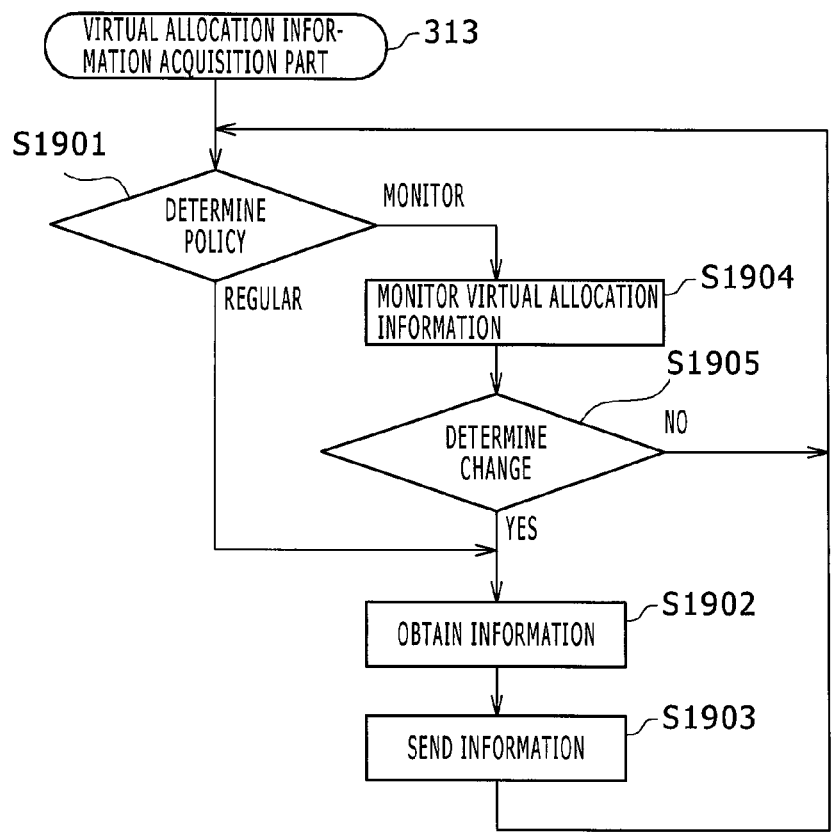
FIG. 23 is a flow chart of the process of a virtual allocation information acquisition part.

FIG. 23 is a flow chart of the process of the virtual allocation information acquisition part. The virtual allocation information acquisition part 313 determines the policy configured in the push installation by the information collection part 210 of the management server 200 (step S1901). If the policy is regular (step S1901, Regular), the process proceeds to step S1902, and if monitor (step S1901, Monitor), proceeds to step S1904.

In step S1902, the virtual allocation information acquisition part 313 obtains information on the contents of the items in the resource information table 211 (see FIG. 7) and the server relationship table 214 (see FIG. 10), from the resource allocation information of the virtualization mechanism part. Then, the virtual allocation information acquisition part 313 sends the obtained information to the information collection part 210 of the management server 200 (step S1903). Then, the process returns to step S1901. The next performance of step S1901 is after a predetermined time has passed.

In step S1904, the virtual allocation information acquisition part 313 determines the presence or absence of a change by monitoring the virtual allocation information to each virtual machine of the virtualization mechanism (step S1905). If there is a change in the information (step S1905, Yes), the process proceeds to step S1902. If there is no change (step S1905, No), the process returns to step S1901.

Figure 24:
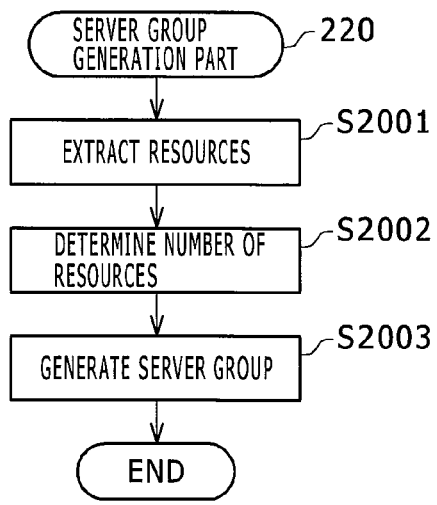
FIG. 24 is a flow chart of the process of a server group generation part.

FIG. 24 is a flow chart of the process of the server group generation part. The server group generation part 220 (see FIG. 2) allows the random number generation part 221 (see FIG. 2) to generate random numbers for all the resources in the resource information table 211 or for each of the resources to a certain extent with respect to the test resources reserved in step S1302 (see FIG. 17), based on the extraction probability Ep (710) of the resource information table 211 (see FIG. 7). Then, the server group generation part 220 determines whether the test resource is used as the resource to be allocated to the server within the server group generation part 220 in this time, and extracts the determined resource (step S2001). Note that step S2001, as the resource extraction method, is a feature of the present embodiment.

The server group generation part 220 determines the number of resources to be allocated to each server of the server group generated from the current server allocation resource information that is stored in the server group of the improvement record table 217 (see FIG. 14) corresponding to the current improvement ID (and that is found from the column of the allocation state 706 of the resource information table 211 (see FIG. 7)) (step S2002). Note that it is also possible to increase and decrease the number of resources to be allocated by adding stochastic fluctuations, with the current number of allocated resources as the default.

The server group generation part 220 generates a server group from the resources extracted in step S2001, by the number of servers of the server group of the improvement record table 217 (see FIG. 14). More specifically, the server group generation part 220 refers to the column of the improvement specification 1402 and the column of the server group relationship 1406, which correspond to the current improvement ID of the improvement record table 217 (see FIG. 14). Then, the server group generation part 220 allocates the resources that meet the resource specification required for the improvement and are extracted in step S2001, as the resources for improvement specification or the common resources. In addition, it is also possible to use the number of resources determined in step S2002 as a reference of the number of resources to be allocated to each server. Further, if the number of resources extracted in step S2001 does not reach the required number of resources, the management server 200 can end the process and retry the process of test improvement part 208.

According to the present embodiment, the management server 200 includes: a storage part of resource information (for example, the resource information table 211) in which the extraction probability Ep is stored as the application information which is the actual result of applying the test server formed by combining resources that can be reserved from the network to which a plurality of servers of the computer system are connected, as the server of the computer system; a job management information storage part in which job management information (for example, the job management table 215) is stored to manage the job determination method, which is the predetermined condition of whether the test server is adopted, for each job; a formation processing part for selecting test resources if the extraction probability is equal to or greater than the random numbers probability Rp generated in the random number generation part 221, with respect to each resource of the resource information, to form a test server by combining the selected test resources; and an application processing part for performing the job by using the formed test server, and if the execution result of the job meets the job determination method, then applying the test server as the server of the particular network. Note that the formation processing part and the application processing part represent the processor 202 as the processing parts of each function.

According to the present embodiment, the management server 200 is capable of selecting test resources if the extraction probability Ep for each resource is equal to or greater than the random numbers probability Rp generated by the random generation part 221 with respect to each resource of the resource information table 211, forming a test server (for example, the test physical server 100b, the test virtual server 130b) by combining the selected resources, performing the job by using the formed test server, and if the execution result of the job meets the job determination method, then applying the test server as the server on the particular network. With this configuration, it is possible to effectively use the resources on the network.

LIST OF REFERENCE SIGNS

100: Physical server
130: Virtual server
131: Virtualization mechanism part
140: Network switch
150: Bus connection control apparatus
160: I/O switch expansion apparatus
170: I/O device
180: Storage apparatus
190: Disk volume
191: Virtual disk
200: Management server
201: Memory (storage part)
202: Processor (processing part)
203: User I/F
204: Network I/F
205: Disk I/F
206: Resource placement improvement part
207: Resource reservation and test improvement part
208: Test improvement part
209: Improved placement application part
210: Information collection part
211: Resource information table
212: Improved resource information table
213: History table
214: Server relationship table
215: Job management table
216: Job result management table
217: Improvement record table
218: Improvement specification-job relationship table
220: Server group generation part
310: Comparative information acquisition part
311: Server relationship information acquisition part
312: Resource information acquisition part
313: Virtual allocation information acquisition part
Ep: Extraction probability
Rp: Random numbers probability

The invention claimed is:

1. A resource management method performed by a management server in a computer system that includes a plurality of servers connected to a network, wherein the resource management method is executable to form a test server by combining resources that can be reserved in the network, wherein the test server is able to be applied as a server if the test server meets a predetermined condition, the resource management method comprising:
   storing, by a processor of the management server, resource information for the resources that can be reserved in the network, the resource information including an extraction probability based on an actual result of applying the test server;
   storing, by the processor of the management server, job management information for managing a job determination method for a respective job executed by the test server, wherein the job determination method indicates the predetermined condition;
   selecting, by the processor of the management server, each resource of the resource information as a test resource if the extraction probability is equal to or greater than a randomly generated probability;
   forming the test server by combining the selected test resources;
   causing the formed test server to perform a job; and
   applying the test server as the server of the network if an execution result of the job meets the job determination method.

2. A resource management method according to claim 1, further comprising:
   if the execution result does not meet the job determination method, repeating, by the management server, the selecting the resources, the forming the test server, and the causing the formed test server to perform the job; and
   storing an execution result of a repeated job into a memory as improvement record information.

3. A resource management method according to claim 1, further comprising:
    causing a current server to perform the job for determining whether the test server is to be applied;
    comparing an execution result of the job performed by the current server with the execution result of the job performed by the test server; and
    applying the test server as the server of the network if performance of the test server exceeds a performance of the current server by at least one result.

4. A resource management method according to claim 1, further comprising:
    identifying one or more servers related to a current server if the current server is specified and if a maintenance request is made;
    forming a plurality of test servers corresponding to a number of the identified one or more servers, by combining the selected resources;
    causing the plurality of test servers to perform the job; and
    applying the plurality of test servers as servers of the network if the execution result of the job meets the job determination method.

5. A resource management method according to claim 1, wherein if a user selects a resource management method by calculation, the management server improves resource placement based on the resource management method by calculation, instead of the resource management method according to claim 1.

6. A resource management method according to claim 2, further comprising:
    changing, by the management server, the extraction probability of at least one resource each time the job is repeated.

7. A resource management method according to claim 2, further comprising:
    increasing, by the management server, the extraction probability of at least one resource to increase a probability of selecting the at least one resource.

8. A resource management method according to claim 2, wherein the resource information includes resource usage, and
    wherein if the resource usage is equal to or higher than a value specified by a user, a recommendation of resource expansion is recorded in the improvement record information.

9. A resource management method according to claim 2, wherein the resource information includes resource usage, and
    wherein if the resource usage is equal to or less than a value specified by a user, a recommendation of resource reduction is recorded in the improvement record information.

10. A resource management method according to claim 2, further comprising:
    if a number of times the execution result of the job does not meet the job determination method exceeds a predetermined number of times, or if a test time in which the execution result of the job does not meet the job determination method exceeds a predetermined time, notifying, by the management server, an administrator that resource placement is not able to be improved.

11. A management server comprising:
    a processor;
    a memory coupled to the processor, the memory storing instructions that, when executed by the processor, cause the management server to perform the operations of:
        storing resource information for resources that can be reserved in the network, the resource information including an extraction probability in the memory based on an actual result of applying a test server formed by combining resources that can be reserved from a network to which a plurality of servers of a computer system are connected; and
        storing job management information in the memory, the job management information including a job determination method that indicates, for a job, a predetermined condition to be met for the test server to be applied as a server of the network;
        selecting a resource of the resource information, as a test resource, if the extraction probability is equal to or greater than a randomly generated probability;
        forming the test server by combining the selected test resources;
        causing the formed test server to perform a job; and
        applying the test server as the server of the network if an execution result of the job meets the job determination method.

12. A management server according to claim 11, wherein the processor further causes the management server to:
    if the execution result does not meet the job determination method, repeat selection of the resource, formation of the test server, and causing performance of the job; and
    store an execution result of a repeated job into the memory as improvement record information.

13. A management server according to claim 11, wherein the processor further causes the management server to:
    cause a current server to perform the job to determine whether the test server is to be applied; and
    apply the test server as the server of the network if the execution result of the test server exceeds an execution result of the job performed by the current server.

14. A management server according to claim 11, wherein the processor further causes the management server to:
    identify one or more servers related to a current server if the current server is specified and if a maintenance request is made;
    form a plurality of test servers corresponding to a number of the identified one or more servers by combining the selected resources;
    cause the plurality of test servers to perform the job; and
    apply the plurality of test servers as servers of the network if the execution result of the job meets the job determination method.

15. A management server according to claim 11, wherein if a user selects a resource management method by calculation, the processor causes the management server to improve resource placement based on the resource management method by calculation, instead of the performing resource selection according to claim 11.

16. A management server according to claim 12, wherein the processor further causes the management server to change the extraction probability each time the job is repeated.

17. A management server according to claim 12, wherein the processor further causes the management server to increase the extraction probability of at least one resource to increase a probability of selecting the at least one resource.

18. A management server according to claim 12,
    wherein the resource information includes resource usage, and
    wherein if the resource usage is equal to or higher than a value specified by a user, the processor causes the management server to record a recommendation of resource expansion in the improvement record information.

19. A resource management method according to claim 12,
wherein the resource information includes resource usage, and wherein if the resource usage is equal to or less than a value specified by a user, the processor causes the management server to record a recommendation of resource reduction in the improvement record information.

20. A resource management method according to claim 12, wherein if a number of times the execution result of the job does not meet the job determination method exceeds a predetermined number of times, or if a test time in which the execution result of the job does not meet the job determination method exceeds a predetermined time, the processor further causes the management server to notify an administrator that resource placement is not able to be improved.

* * * * *